(12) United States Patent
Wallström

(10) Patent No.: US 12,378,421 B2
(45) Date of Patent: *Aug. 5, 2025

(54) FREEZE-DRIED LOADED AEROGEL PARTICLES WITH BIOCIDAL PROPERTIES

(71) Applicant: AEROGEL APS, Copenhagen Ø (DK)

(72) Inventor: Eva Wallström, Copenhagen Ø (DK)

(73) Assignee: AEROGEL APS, Copenhagen Ø (DK)

(*) Notice: Subject to any disclaimer, the term of this patent is extended or adjusted under 35 U.S.C. 154(b) by 0 days.

This patent is subject to a terminal disclaimer.

(21) Appl. No.: 18/572,144

(22) PCT Filed: Jun. 30, 2022

(86) PCT No.: PCT/EP2022/068179
§ 371 (c)(1),
(2) Date: Dec. 19, 2023

(87) PCT Pub. No.: WO2023/275312
PCT Pub. Date: Jan. 5, 2023

(65) Prior Publication Data
US 2024/0270982 A1   Aug. 15, 2024

(30) Foreign Application Priority Data
Jun. 30, 2021   (EP) .................................. 21182697

(51) Int. Cl.
| | | |
|---|---|---|
| *C09D 5/16* | (2006.01) | |
| *A01N 25/04* | (2006.01) | |
| *A01N 25/28* | (2006.01) | |
| *A01P 15/00* | (2006.01) | |
| *C08K 3/36* | (2006.01) | |
| *C09D 5/14* | (2006.01) | |

(52) U.S. Cl.
CPC ........... *C09D 5/1687* (2013.01); *A01N 25/04* (2013.01); *A01N 25/28* (2013.01); *A01P 15/00* (2021.08); *C08K 3/36* (2013.01); *C09D 5/14* (2013.01); *C08K 2201/001* (2013.01)

(58) Field of Classification Search
CPC ........... A01N 25/04; A01P 15/00; C08K 3/36; C09D 5/1606
See application file for complete search history.

(56) References Cited

U.S. PATENT DOCUMENTS

2019/0143290 A1* 5/2019 Bertino .................... C08J 3/075
521/64

FOREIGN PATENT DOCUMENTS

WO    WO-2020002659 A1 *  1/2020  ............. A01N 25/04

OTHER PUBLICATIONS

Pikal et al., "The collapse temperature in freeze drying: Dependence on measurement methodology and rate of water removal from the glassy phase", International Journal of Pharmaceutics, 1990, 62: 165-186.
Dorcheh et al., "Silica aerogel; synthesis, properties and characterization", Journal of Materials Processing Technology, 2008, 199: 10-26.

* cited by examiner

*Primary Examiner* — Mark V Stevens
(74) *Attorney, Agent, or Firm* — James S. Keddie; Bozicevic, Field & Francis LLP

(57) ABSTRACT

The present invention relates to silica aerogels with a high to very high loading (55-90% w/w) of encapsulated biocidal and/or biorepellant compounds, high porosity and low thermal conductivity and to methods of making and using such aerogels in antifouling compositions, which are especially suitable for both onshore and offshore coatings (marine paints, coatings, sealants, lacquers, wood protection or similar controlled leaching systems) that are naturally exposed to humid conditions and/or water, including sea water, and thus prone to fouling.

12 Claims, 8 Drawing Sheets

FIG.2

Figure 1:
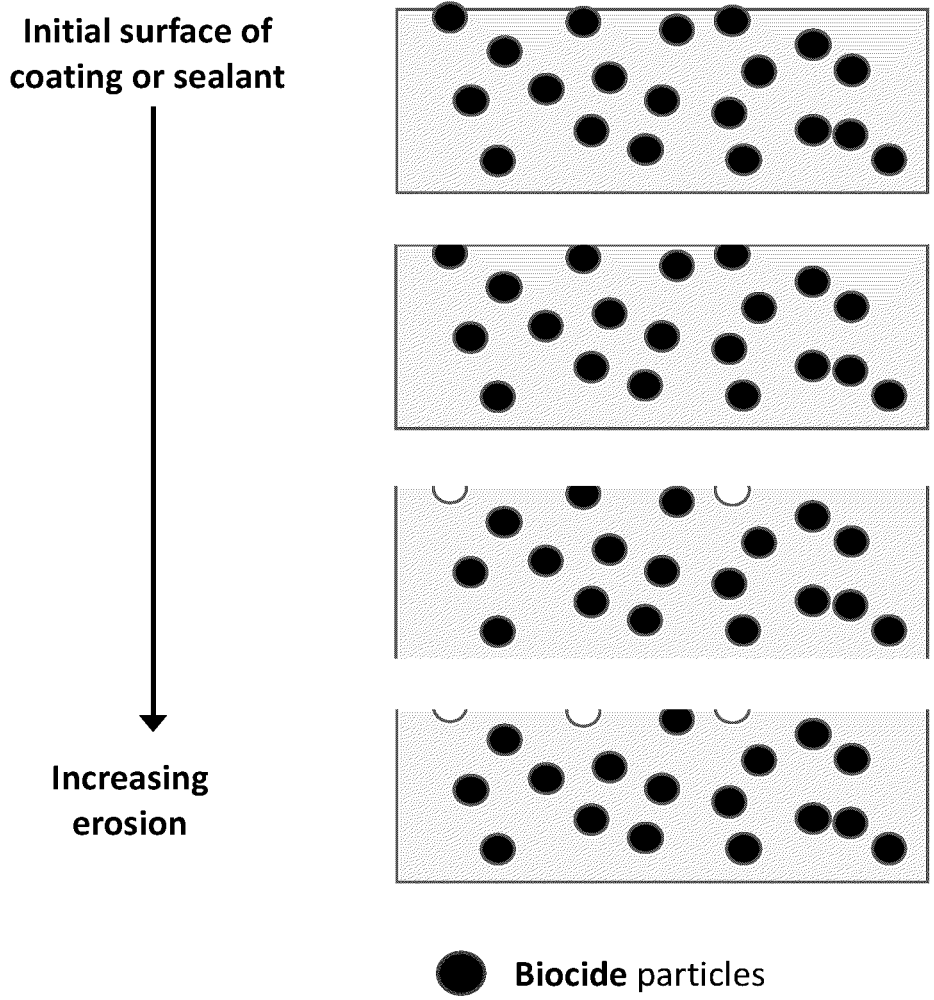
Figure 4:
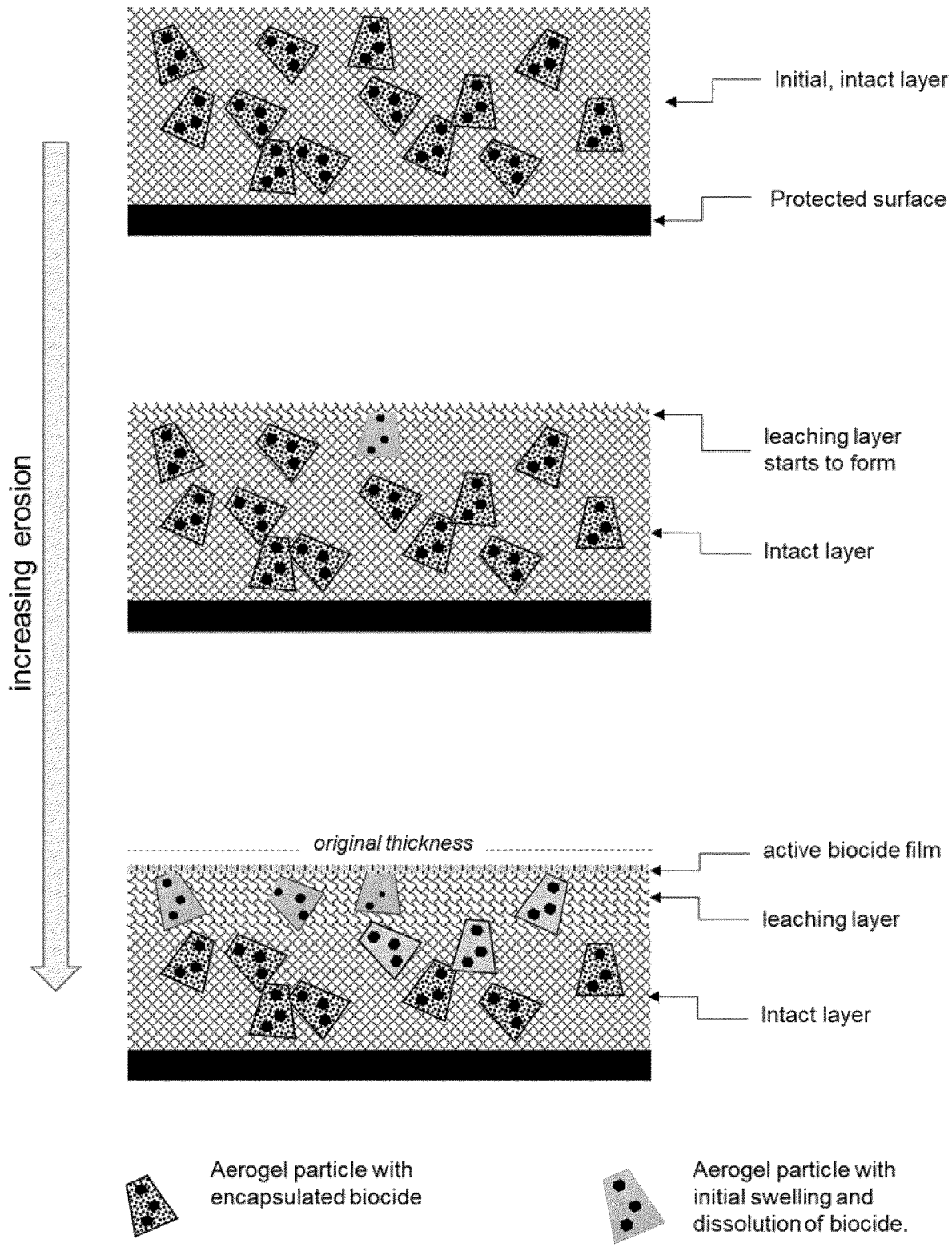

Biocide content in wet paint (w%) as a function of biocide loading in aerogel (w%)
silica limit = 1.5%

FIG.3

Aerogel particles with encapsulated biocide

Paint or sealant composition

Biocide

| Ref. | Sample | Drying | Total Porosity [%] | Bulk density at 14.5 psia [g/mL] | Interparticle Pore Diameter at LP [μm] | Intraparticle Pore Diameter at HP [nm] | Total intrusion volume [mL/g] |
|---|---|---|---|---|---|---|---|
| FD1 | Empty gel w/o biocide | Freeze-drying; Freezing temp. -80°C | 29.4 | 0.857 | 42.0 | 10.5 | 1.22 |
| FD2 | Empty gel w/o biocide | Freeze-drying; Freezing temp. -18°C | 27.5 | 0.970 | 45.9 | 10.5 | 1.13 |
| FD3 | Loaded gel (Diuron 65%) | Freeze-drying; Freezing temp. -80°C | 38.9 | 0.867 | 16.3 | 10.9 | 1.29 |
| FD4 | Loaded gel (Diuron 65%) | Freeze-drying; Freezing temp. -18°C | 37.1 | 0.920 | 15.2 | 10.5 | 1.16 |

FIG. 5 (Table 1)

| Ref. | Sample | Drying | Total porosity [%] | Bulk density at 14.5 psia [g/ml] | Interparticle Pore Diameter at LP [μm] | Intraparticle Pore Diameter at HP [nm] | Total intrusion volume [mL/g] |
|---|---|---|---|---|---|---|---|
| FD5 | Loaded gel (Econea 66%) (*NB prepared w/o MTMS*) | Freeze-drying Freezing temp. -80 °C | 70,70 | 0,43 | 2,76 | 17,9 | 2,48 |
| FD6 | Loaded gel (DCOIT 56.4 %) | Freeze-drying Freezing temp. -80 °C | 67,80 | 0,33 | 7,33 | 62,7 | 3,39 |
| FD7 | Loaded gel (Zineb 75%) | Freeze-drying Freezing temp. -80 °C | 66,40 | 0,52 | 4,07 | 29,3 | 1,60 |
| FD8 | Loaded gel (CuPt 75%) | Freeze-drying Freezing temp. -80 °C | 52,90 | 0,71 | 2,30 | 13,2 | 1,13 |
| FD9 | Loaded gel (ZnPt 75%) | Freeze-drying Freezing temp. -80 °C | 54,10 | 0,71 | 5,50 | 11,0 | 1,16 |
| FD10 | Loaded gel (Econea 75%) | Freeze-drying Freezing temp. -80 °C | 58,70 | 0,57 | 2,60 | 10,0 | 1,42 |
| FD11 | Loaded gel (Econea 75%) | Supercritical drying | 54,60 | 0,56 | 1,70 | 17,0 | 1,54 |

FIG. 6 (Table 2)

| Ref. | Sample | Drying | Total Porosity [%] | Bulk density at 14.5 psia [g/mL] | Interparticle Pore Diameter at LP [μm] | Intraparticle Pore Diameter at HP [nm] | Lambda mW/m*K |
|---|---|---|---|---|---|---|---|
| SC7 | Loaded gel (Zineb 75%) | Supercritical drying | 73,40 | 0,33 | 5,73 | 33,30 | 37,8 |
| FD7 | Loaded gel (Zineb 75%) | Freeze-drying; Freezing temp. -80°C | 66,40 | 0,52 | 4,07 | 29,30 | 71,3 |
| SC8 | Loaded gel (CuPt 75%) | Supercritical drying | 71,10 | 0,31 | 6,92 | 31,10 | 43,3 |
| FD8 | Loaded gel (CuPt 75%) | Freeze-drying; Freezing temp. -80°C | 52,90 | 0,71 | 2,20 | 13,20 | 72,5 |
| FD5 | Loaded gel (Econea 66%) (*NB prepared w/o MTMS*) | Freeze-drying; Freezing temp. -80°C | 70,70 | 0,43 | 2,76 | 17,90 | 36,6 |
| TC1 | Loaded gel (CuPt 75%) | Supercritical drying | n/a | n/a | n/a | n/a | 37,0 |
| TC2 | Loaded gel (ZnPt 75%) | Supercritical drying | n/a | n/a | n/a | n/a | 31,2 | n/a = information not available

FIG. 7 (Table 3)

FIG.8

| Name + CAS no | Chemical structure | Density g/cm³ | Solubility in water, 20 °C (mg/ml) |
|---|---|---|---|
| DCOIT<br><br>CAS 64359-81-5 | | 1,28 | 3,47 |
| Econea<br><br>CAS 122454-29-9 | | 1,71 | 168,0 |
| Diuron<br><br>CAS 330-54-1 | | 1,48 | 29,0 |
| Zineb<br><br>CAS 12122-67-7 | | 1,74 | Practically insoluble |
| Zinc pyrithione<br><br>CAS 13463-41-7 | | 1.78 | < 1 |
| Tolylfluanid<br><br>CAS 731-27-1 | | 1,52 | 0,9 |
| Terbutryn<br><br>CAS 886-50-0 | | 1,12 | 22,0 |
| Thiabendazole<br><br>CAS 148-79-8 | | 1,40 | 31,0 |

FREEZE-DRIED LOADED AEROGEL PARTICLES WITH BIOCIDAL PROPERTIES

CROSS-REFERENCE TO RELATED APPLICATIONS

This application is a § 371 national phase of International Application No. PCT/EP2022/068179, filed on Jun. 30, 2022, which claims the benefit of European Application No. 21182697.9, filed on Jun. 30, 2021, all of which applications are incorporated by reference herein.

FIELD OF THE INVENTION

The present invention relates to silica aerogels with a high to very high loading (55-90% w/w) of encapsulated biocidal and/or biorepellant compounds, high porosity and low thermal conductivity and to methods of making and using such aerogels in anti-fouling compositions, which are especially suitable for both on-shore and offshore coatings (marine paints, coatings, sealants, lacquers, wood protection or similar controlled leaching systems) that are naturally exposed to humid conditions and/or water, including sea water, and thus prone to fouling.

BACKGROUND OF THE INVENTION

Biocides and biorepellents are substances that are used to prevent unwanted growth of biological organisms from buildings, installations, or other areas. Biocides and biorepellents are typically added to products such as protective coatings, including paints and lacquers, which may be applied to areas susceptible to such unwanted growth, and may also be added to elastic sealants such as silicone sealants Protective coatings applied for exterior or interior use typically have two basic functions, protection, and decoration. Elastic sealants are typically used to close joints and cracks between non-elastic surfaces such as ceramic tiles where the function of the sealant is to hide the joint or crack, absorb the settling of the non-elastic surfaces and prevent moisture from entering.

Attack of biological organisms such as e.g. fungi and algae—either in the wet state or at the painted surface—can impair both the protection rendered by the paint film and its decorative effect. This biological process is termed fouling. Mold and mildew are common fungi types which can attack both indoor and outdoor surfaces, which often become humid. Mold spores can become a serious allergy problem and over time mold and other fungi destroys especially wood-based construction materials, so mold and other types of fouling are important to prevent efficiently.

Ship surfaces exposed to seawater present a special problem as they are inclined to settlement of microorganisms, plants, algae, and animals, thereby increasing the propulsion resistance of the vessel, and hence reducing speed or increasing fuel consumption. This biological process is termed fouling and can be classified in two broad groups: Microfouling which includes colonies of unicellular algae and bacteria, often referred to as "slime", and Macrofouling, which includes both plant (weed) and animal fouling. Especially Macrofouling pose problems in relation to propulsion resistance.

Fouling of the types mentioned is commonly fought using paints, coatings and sealants which release biocidal compounds that are active on the surface. Biocides are chemical compounds, which are toxic to microbial cells, and thereby prevent the growth of unwanted micro and macro-organisms (i.e., foulants), whereas the less frequently used biorepellants typically have a relatively low toxicity, and work by repelling or deterring the unwanted biological organisms from areas which otherwise would attract foulants.

Most anti-fouling compounds are not efficient against all types of foulants, why combinations of active compounds are employed. In traditional anti-fouling coatings and sealants, the leaching of the active compounds rarely follows the same decay curve. Before the end of its service life, the coating or sealant may thus become only partially successful at preventing fouling.

The release of biocides and/or biorepellents from anti-fouling coatings can be controlled by encapsulating the active compounds, which prolongs their effective lifetime in different matrices by protecting them from leaching and unwanted degradation reactions, and by releasing them slowly. Ideally, an encapsulation method should therefore allow for a high loading of biocide/biorepellent in the encapsulation material with constant release of the active compound from the encapsulation material throughout the service lifetime of the coating. This combination of features ensures a long-lasting anti-fouling effect of the coating, makes best use of the added active compound, and thereby reduces both the cost of goods (CoG) and the negative environmental impact.

The inventors of the present invention have previously developed a method for encapsulation of solid active compounds in silica aerogel particles, which is described in international patent application WO 2009/062975. According to the described procedure, which involves using supercritical $CO_2$ extraction for drying the initial wet gel, such "loaded" aerogels with a content of encapsulated solid active compounds of about 50% w/w could be achieved on a small scale. This encapsulation protocol has later been elaborated by the inventors in the international patent application WO 2020/002659, which describes aerogels with a content of encapsulated solid active compounds of 60-90%.

The loading limit of solid active compounds in silica aerogels is of high importance for their eventual use as anti-fouling components in coating or sealant compositions. When biocides encapsulated in silica aerogels are added to an anti-fouling composition, silica is necessarily added as well in the ratio determined by the loading percentage of the particular aerogel. The inventors have found that anti-fouling composition as a rule of thumb should not contain more than about 1.5% w/w $SiO_2$ (silica), as the composition otherwise becomes too thick/viscous and difficult to apply evenly. Therefore, increasing the amount of biocide in an anti-fouling coating or sealant composition cannot be attained just by adding larger amounts of loaded aerogel to the coating compositions because of the 1.5% silica limit. For example:

An aerogel with a 40% content of biocide contains 60% silica. To keep below the 1.5% silica limit, such an aerogel can thus at most be added in 2.5% w/w of the coating composition. A coating or sealant composition made with this aerogel will thus contain 1.25% w/w biocide. It is not possible to add more biocide by this route without exceeding the 1.5% silica limit.

An aerogel with a 50% content of biocide contains 50% silica. Such an aerogel can thus at most be added in 3% w/w of the composition to keep below the 1.5% silica limit. This means that the final composition will contain 1.5% w/w biocide. It is not possible to add more biocide by this route without exceeding the 1.5% silica limit.

An aerogel with 80% w/w biocide contains 20% silica, so up to 7.5% w/w of this aerogel can be added to the composition. A final composition made with this aerogel will contain 80%×7.5%=6% w/w biocide, and still not more than 1.5% silica.
- If an aerogel with a 90% biocide loading is used, 15% w/w of the aerogel can be added, achieving a level of 13.5% w/w biocide in the composition without exceeding the 1.5% "silica limit".

FIG. 2 shows the content of biocide in a coating composition (in w-%) as a function of the biocide loading in the aerogel when max. 1.5% silica may be added to the composition.

The loaded aerogel particles of both WO 2009/062975 and WO 2020/002659 are produced by SOL-GEL encapsulation of biocidal compounds in a silica-containing wet gel, which is subsequently dried by supercritical (SC) CO2 extraction. This production method has proven versatile and well-suited for affording many different types of loaded gels for R&D purposes. However, for the purpose of larger scale production the supercritical extraction step is considered non-ideal, as the process consumes a large amount of solvent, and requires a significant amount of time for the exchange of solvents, thus increasing the overall cost. The required production equipment is furthermore both expensive and somewhat hazardous to operate due to the high pressures required (Muhammad 2021).

Moreover, certain types of biocides are not easily encapsulated in aerogels using the supercritical drying method due to solubility issues. Finally, the resulting SC dried aerogel particles prepared according to WO 2009/062975 or WO 2020/002659 are often too hard to be directly mixed with other paint ingredients but require a separate grinding step before formulating into antifouling paints.

The present inventors have further improved on the SOL-GEL process in co-pending international application PCT/EP2020/087730 but were not able to overcome the issues regarding drying the initial wet gel in a scalable, industrially applicable, and economic sound fashion. Initial attempts at using freeze-drying in lieu of supercritical (SC) CO2 extraction thus only afforded gels with a relatively poor total porosity and high bulk density.

There thus remains a need for a scalable encapsulation method which can give access to a wide selection of biocides and biorepellants in an encapsulated form with

- a high loading of active compounds,
- a satisfactory pore structure to ensure sufficient water absorption in the resulting coating or sealant incorporating the encapsulated biocide, and
- a constant concentration of biocide on the surface of the anti-fouling composition over its entire lifetime, and
- competitive CoG.

BRIEF DESCRIPTION OF DRAWINGS

FIG. 1 shows the surface of an anti-fouling coating or sealant composition which comprises solid biocide-particles (FIG. 1, black circles) which constantly become accessible in the film surface as the coating or sealant is degraded over time, e.g. by exposure to water, high humidity and/or temperature fluctuations. After a while the partially abraded particles are washed out of the coating (FIG. 1, white half-circles).

FIG. 2 shows the content of biocide in a paint composition (in w-%) which comprises biocide encapsulated in silica aerogel particles as a function of the biocide loading in the aerogel when at most 1.5% silica may be added to the coating.

FIG. 3 shows a cross section of an anti-fouling composition layer containing aerogel particles which are distributed uniformly in the layer. The paint layer is in this case app. 300 μm thick. Each aerogel particle may contain several discrete particles of active compound, and each aerogel particle has a dimension, depending on the fineness of grind, of app. 10 μm.

FIG. 4 shows a close-up of the anti-fouling composition layer containing aerogel particles shown in FIG. 3. As the composition is exposed to humidity it starts absorbing water, thereby creating an upper layer termed the leaching layer. The aerogel particles embedded in the leaching layer absorb water due to the porous and hygroscopic nature of silica-based aerogels, and after a while a saturated solution of the active compound (e.g. biocide) is created inside the aerogel particle. By diffusion through the leaching layer, a film of active biocide is created on the surface of the anti-fouling composition layer.

The leaching layer may for example be renewed by erosion of the upper part of the layer and penetration of water into the deeper lying areas of the intact anti-fouling composition layer. If erosion is negligible or slow, the leaching layer will increase with time and the biocidal effect will purely be due to diffusion.

FIG. 5 is a table (Table 1) showing the porosimetry results of freeze-dried aerogels FD1-FD4 originally disclosed in co-pending international application PCT/EP2020/087730. Table 1 compares two empty gels with two loaded gels frozen at two different temperatures, −18° C. and −80° C. All gels in Table 1 were prepared with pre-condensated TEOS+MTMS. As can be seen, all gels had a total porosity <40% and bulk densities close to 1 gr/cm$^3$. The total porosity is influenced significantly by the presence of loaded biocide (compare FD1/FD2 vs. FD3/FD4), whereas the freezing temperature does not seem to have a great impact on either total porosity or density (FD1/FD3 vs. FD2/FD4).

FIG. 6 is a table (Table 2) showing the porosimetry results of six freeze-dried, loaded aerogels FD5-FD10 prepared according to the present invention. Ref. FD5 contains 66% Econea, FD6 contains 56% DCOIT, FD7 contains 75% Zineb, FD8 contains 75% Cu Pyrithione (CuPt, reference sample), FD9 contains 75% Zn Pyrithione (ZnPt), and FD10 contains 75% Econea. All gels were prepared with TEOS and MTMS except FD5 which was prepared without MTMS. For all samples the total porosity was at least 50%, and the mesopore diameter (i.e. intraparticle diameter) was at least 10 nm. Table 2 also contains the porosimetry results for sample FD11, which is a supercritically dried (CO2) gel containing 75% Econea, otherwise produced similarly to sample FD10.

FIG. 7 is a table (Table 3) showing the thermal conductivity of various loaded aerogels prepared under either freeze-drying or—for comparison purposes—supercritical conditions. Ref SC7 and FD7 are loaded gels containing 75% Zineb, dried under supercritical or freeze-drying conditions, respectively. Similarly Ref. SC8 and FD8 are loaded gels containing 75% CuPt and dried under supercritical or freeze-drying conditions, respectively. FD5 is a loaded gel containing 66% Econea and freeze-dried. Ref. TC1 and TC2 are two freeze-dried loaded gels containing 75% CuPt and 75% ZnPt, respectively, for which the thermal conductivities of were originally disclosed in co-pending international application PCT/EP2020/087730.

FIG. 8 is a table showing the chemical structures of some of the biocides used to produce loaded aerogels according to the present invention, and also their densities and aqueous solubilities. As can be seen, there is a quite significant difference between the biocidal compounds, both as regards chemical structure, density and solubility.

SUMMARY OF THE INVENTION

The inventors of the present invention have now found that aerogels with a high to very high loading (55-90% w/w) of encapsulated biocidal and/or biorepellent compounds (referred to as "loaded aerogels" in the following) can be prepared by a modification of the manufacturing method of WO 2020/002659 in which the supercritical (SC) extraction step is replaced by freeze drying.

The freeze-dried, loaded aerogels have further been found by mercury porosimetry to have a total porosity of at least 50% and an intraparticular pore diameter, (or "mesopore" diameter) of at least 10 nm. The inventors believe that a total porosity of at least 40% is sufficient to achieve a satisfactory water uptake in the final antifouling composition as long as the mesopore diameter is at least 10 nm.

The freeze-dried, loaded aerogels have finally been found to have a low thermal conductivity (30-75 mW/m*K) which is surprising, given their high loading of compounds having thermal conductivities on the order of 200-300 mW/m*K.

In a first aspect the present invention thus provides an antifouling additive comprising a. an inorganic, silica-containing aerogel comprising
b. a porous gel lattice with
i. a total porosity of at least 40% and
ii. a mesopore diameter of at least 10 nm,
c. optionally an alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
d. at least 55% by weight of one or more biocidal or biorepellant compounds selected from 4,5-Dichloro-2-octyl-4-isothiazolin-3-one (DCOIT), 2-(p-chlorophenyl)-3-cyano-4-bromo-5-trifluoromethyl pyrrole (Econea), Zinc ethylenebisthiocarbamate (Zineb), 3-(3,4-Dichlorophenyl)-1,1-dimethylurea (Diuron), 3-iodo-2-propynylbutylcarbamate (IPBC), 2-tert-butylamino-4-ethylamino-6-methyl-thio-1,3,5-triazine (Terbutryn), 1-(4-chlorophenyl)-4,4-dimethyl-3-(1H-1,2,4-triazol-1-ylmethyl) pentan-3-ol (Tebuconazole), Zinc pyrithione, Tolylfluanid, Dichlofluanid, N,N-Didecyl-N,N-dimethylammonium Carbonate, N,N-Didecyl-N,N-dimethylammonium Bicarbonate, 2-thiazol-4-yl-1H-benzoimidazole (Thiabendazole), 4-[1-(2,3-dimethylphenyl)ethyl]-3H-imidazole (Medetomidine) and mixtures thereof entrapped in said aerogel, wherein the entrapment of said one or more biocidal or biorepellant compounds takes place during the SOL-GEL formation of the gel, and wherein the SOL-GEL precursor is one or more alkoxysilanes selected from tetraethoxysilane, tetrapropoxysilane and alkyltrialkoxysilanes.

The antifouling additive of the first aspect can as mentioned be afforded by a newly developed manufacturing procedure, which is a further development of the methods described in PCT application WO 2020/002659.

In a second aspect the invention thus further provides a method for providing an antifouling additive of the first aspect, comprising the following steps:

a. Prepare the SOL-GEL precursor Solution 1:
i. 100-450 parts of one or more biocidal or biorepellant compounds is dissolved in 100-500 parts of a lower alcohol such as ethanol. A dispersant may optionally be added. HCl (or another aqueous inorganic acid) can optionally also be added. An alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu can also optionally be added at this point.
ii. 100 parts tetraalkoxysilan are mixed with 0-50 parts of an alkyltrialkoxysilane.
iii. Mix the alkoxysilane mixture with the solution of the one or more biocidal or biorepellant compounds.
b. Prepare the catalyst Solution 2:
100 parts of a lower alcohol such as Ethanol, app. 50 parts water and 0.25-15 parts of a gelling catalyst are mixed.
c. Solution 2 is added gradually to Solution 1 with vigorous stirring. Stirring is continued at reduced speed until signs of gelling are observed. The resulting solution may be transferred into one or more separate containers for gelation.
d. The gel is aged in suitable containers for 2-5 days after which it is frozen, typically at a temperature of −18° C. or lower, such as −80° C., depending on the solvent employed. Before freezing the wet gel, the solvent may be exchanged by another solvent having a higher melting point and preferably a low expansion coefficient such as tert-butanol.
e. The frozen gel is then freeze-dried under a suitable vacuum, keeping a shelf temperature below the collapse temperature $T_C$ for the gel until the frozen solvent has been removed by sublimation. The freeze-dried solid may then undergo a secondary drying phase at elevated temperatures, wherein said one or more biocidal or biorepellant compounds is entrapped in the gel during the SOL-GEL formation of the gel.

For the preparation of Solution 1 and 2, ethanol or another $C_1$-$C_4$ alcohol can conveniently be used as solvent. The gelling catalyst may be either basic or acidic in nature, depending on the specific biocide.

The collapse temperature $T_C$ is defined at the temperature at which the material softens to the point of not being able to support its own structure. $T_C$ is often close to the glass transition temperature Tg', defined as the temperature at which the frozen material changes from a brittle to a flexible structure. Freeze drying microscopy (FDM) can be used to identify temperatures at which visible changes occur for a specific frozen gel (see Methods section).

In a third aspect there is provided an antifouling additive obtainable by the method according to the second aspect.

In a fourth aspect there is provided the use of an antifouling additive according to the first or third aspect, in marine coatings or coatings intended for wood protection, facades, patios or fronts and other humid environments, or for humid indoor environments.

In a fifth aspect there is provided an antifouling paint or sealant composition comprising the antifouling additive according to the first or third aspect of the present invention.

DETAILED DESCRIPTION

As described in the summary of invention, the inventors have now developed a new manucfacturing procedure which is well-suited for the commercial/industrial production of aerogel particles comprising encapsulated biocides and/or biorepellants. This has been a goal since the inventors of the present invention realized that the antifouling effect of anti-fouling coatings and sealants which comprise biocidal and/or biorepellent active compounds encapsulated in aerogel particles to a large degree is dependent on correctly managing the water absorption of the composition. It has specifically been found that a too low water absorption (<1 wt-%) may lead to fouling (because the biocide cannot exert its effect under too dry conditions), whereas a too high water absorption can lead to a too fast dissolution and eventual loss of biocide.

It has thus been found important that the anti-fouling composition can absorb enough water to maintain a saturated solution of the active compound in the surface layer of the coating or sealant composition. A value for the water absorption in the range of about 1.5-6% is regarded as optimal.

The inventors have moreover found that to tailor the performance of the anti-fouling coating and sealant composition, the water absorption of the embedded aerogel particles themselves must be controlled. The two most important influential parameters for this purpose are 1) the loading of active compound in the encapsulating aerogel particle and 2) the porosity of said aerogel particles. A high content uniformity, i.e. a highly homogeneous distribution of the encapsulated biocide or biorepellant in the aerogel particles, is also important for the performance of the anti-fouling coating and sealant composition.

It has therefore been an objective of the present invention to afford silica aerogel particles with a high to very high loading (55-95% w/w) of homogeneously distributed biocide and/or biorepellant—"loaded aerogel particles", which particles when formulated into antifouling coatings lead to a satisfactory water absorption of the dry coating, such as in the range of 1.5-6% w/w. Coatings meant for on-shore wood constructions can have a higher range, for example up to 11% w/w. It has been a further objective that the manufacturing procedure for said loaded aerogel particles should be scalable and amenable to industrial implementation. It has been an even further objective that the loaded aerogel particles should be easy to formulate into antifouling coatings, sealants etc.

The inventors have continued the development of the encapsulation procedure disclosed in WO 2020/002659 with an aim to allow for an even wider selection of biocides and biorepellants, which have so far been limited by solubility issues during the supercritical drying phase (e.g. DCOIT and other biocides with a high solubility in ethanol), or incompatibilities with the selected gelling catalysts or conditions.

These objectives have now been reached for a broad range of different biocides and/or biorepellants.

Similar to the method employed in WO 2020/002659, the production method of the present invention is initiated by gelation of a mixture of one or more SOL-GEL precursors in the presence of a gelling catalyst. The employed SOL-GEL precursors are alkoxysilanes selected from tetraalkoxysilanes and alkyltrialkoxysilanes.

Three reactions result when an alkoxysilane (typical alkoxy groups are methoxy and ethoxy, R=Me or Et) reacts with water, typically in the presence of a catalyst, together resulting in the formation of silica nanoparticles (which eventually interconnect to form a gel). The first of these reactions is hydrolysis, in which the alkoxysilane reacts with water to form silanol (Si—OH) groups. These silanol groups can then react either with each other or an alkoxide group (Si—OR) to form a siloxane bridge (Si—O—Si), resulting in the joining of two molecules into one larger molecule. Each silicon atom can form up to four siloxane bridges (as silicon is tetravalent), allowing for many small molecules to connect into giant molecules which contain thousands of silicon-oxygen bridges. However, during the formation of a silica nanoparticle, not every silicon atom ends up forming four siloxane bridges and instead hangs on to one or more of its hydroxyl (—OH) or original alkoxy (—OR) groups. These are called "terminal groups" and cover the surface of the nanoparticles.

At some point, the silica nanoparticles reach a critical size where they stop growing and instead agglomerate with other nanoparticles. The terminal hydroxyl and alkoxy groups on the surface of the nanoparticles allow the nanoparticles to interconnect with each other, kind of like atomic Velcro balls. When enough of these nanoparticles have joined together a continuous network spans the liquid solution, and an "alcogel" has formed.

The difference between processes for preparing "normal" (i.e. not loaded) aerogels and processes for preparing loaded aerogels such as described in WO 2020/002659 and/or herein is that a biocide (or biorepellant) is added to the solution of the one or more alkoxysilanes before the gelation is initiated, i.e. before the "alcogel" is formed. This ensures that the biocide (or biorepellant) eventually is entrapped in the gel.

When a sol reaches the gel point, the silica backbone of the gel still contains a significant number of unreacted alkoxide groups, and sufficient time must therefore be given for the strengthening of the silica network, commonly referred to as "aging". The gels are best left undisturbed for up to 48 hours.

It is well-known (see K Sinco 2010) that variations in synthesis conditions (e.g., the type of precursors, catalyst, and surfactants; the ratio of water to precursor; the concentrations; the medium pH; the solvent; the drying method) modify the structure and properties of aerogels. Synthesis parameters influence both hydrolysis and condensation rates and thereby regulate the kinetics and mechanism of the SOL-GEL process.

Several studies have been reported on the influence of the precursors. The most common silicon precursors are the alkoxysilanes, $Si(OR)_4$. The reaction rate of these compounds decreases in the following order:

$$Si(OMe)_4 > Si(OEt)_4 > Si(O^nPr)_4 > Si(O^iPr)_4$$

This "alkoxy effect" on reaction rate may influence the final product characteristics. Thus, comparing the aerogels obtained from various Si alkoxides, tetramethoxysilane [$Si(OMe)_4$] was found to yield more narrow and uniform pores and higher surface area than tetraethoxysilane [$Si(OEt)_4$]. Zhang (2011) similarly found that when these gel precursors are used to prepare "normal" (i.e. not loaded) aerogels, the resulting gels have different physical properties. Zhang (2011) on page 40 thus mentions that "it has been found that the precursors: TEOS, TMOS and PEDS (polyethoxydisiloxane) strongly affect the physical properties like bulk density, percentage of porosity, pore size distribution, optical transmission, surface area, thermal conductivity and microstructure of silica aerogels".

Another study by Li et al. (2020) notes that different precursors may not only lead to a difference in density, porosity etc. of the aerogels, but will also lead to a molecular difference in the terminal groups placed on the surface of the produced aerogel particles. Thus, unless the aerogel surface has been explicitly modified/derivatized (e.g. through chemical reaction with trimethylsilyl chloride, $Me_3SiCl$), " . . . silica aerogels bear silanol and/or alkoxy groups on their internal surfaces, originating from the silica precursor (water glass, silicon alkoxides) and the gelation, aging, and washing solutions (alcohol, water) . . . unmodified aerogels have a surface coverage of silanol and alkoxy groups and are hydrophilic". (Li 2020).

It follows that chemically unmodified gel particles produced with the three different precursors TMOS, TEOS and TPOS will have a surface coverage of silanol and methoxy, ethoxy and propoxy groups, respectively.

The final, and most important, process in making silica aerogels is the step where the liquid within the gel is removed, leaving only the linked silica network.

If the wet gel is dried under circumstances where capillary forces cause the partial collapse of the porous silica structure, the dry and then usually wrinkled gels are referred to as xerogels or cryogels. Thus, in order to preserve the porous structure of the gel, the gel can be dried according to the supercritical drying approach where no capillary forces emerge. First, the organic solvent is extracted from the gel using compressed CO2 at operational conditions above the mixture critical point of the mixture of pore liquid and CO2. This ensures the extraction in a single-phase mixing process where no liquid-gas interfaces and thus no capillary forces can emerge. After the complete substitution of the organic solvent with CO2, the CO2 can be released also in a single-phase process during slow depressurization at operational conditions above its critical temperature. What remains is a dried gel, whose pores are directly after the drying process filled with CO2. When the dry gel is exposed to air the CO2 is exchanged by air and the gel is referred to as aerogel. This method is by far the most common way of producing aerogels and has also been extensively used by applicant to produce loaded aerogels, e.g. as disclosed in WO 2020/002659.

It has been found (e.g. Dorcheh 2008) that the surface of chemically unmodified aerogel particles prepared from tetraalkoxysilanes and dried with the supercritical CO2 will only contain hydroxyl (Si—OH) terminal groups. The original alkoxy (Si—OR) groups are hydrolyzed under the process conditions (several hours at ~40° C. and 110 bars in a fluid phase system). This is different from the freeze-drying process, where the very low temperatures (-80° C.) and/or the solid phase system substantially prevent reactions of the terminal groups. Thus, chemically unmodified aerogels dried with CO2 under supercritical conditions will differ from freeze-dried aerogels not only by having different bulk density, porosity etc. discussed above, but also in that the terminal groups on the surfaces of the two types of aerogels will not be identical. Aerogels dried with CO2 under supercritical conditions will typically have surfaces covered with silanol (Si—OH) terminal groups, whereas aerogels prepared by freeze-drying typically will have a mixture of silanol (Si—OH) and alkoxysilane (Si—OR) terminal groups.

The most notable difference between the present invention and the disclosure of WO 2020/002659 relates to the drying of the initially formed alcogel ("wet gel") by using freeze-drying (lyophilization) rather than supercritical carbon dioxide extraction.

The use of freeze-drying for the preparation of loaded aerogels was initiated by the inventors in co-pending international application PCT/EP2020/087730, which relates to various process improvements over the method of WO 2020/002659, primarily in the SOL-GEL formation of the wet gel (increased amount of water in the gelation mixture+ reversed addition of reactants). Inspired by the higher water content the inventors made some initial attempts at freeze-drying loaded wet gels of PCT/EP2020/087730, which resulted in gels having a relatively low porosity (<40%) and bulk densities close to 1 gr/cm$^3$ (ref. FD1-FD4 in Table 1 (FIG. 5). Table 1 compares two empty gels with two loaded gels frozen at two different temperatures, -18° C. and -80° C. All gels in Table 1 were prepared with precondensated TEOS+MTMS.

As can be seen, the porosity is influenced significantly by the presence of loaded biocide (compare FD1/FD2 vs. FD3/FD4), whereas the freezing temperature does not seem to have a great impact on either total porosity or density (FD1/FD3 vs. FD2/FD4).

Another difference vis-à-vis the method of WO 2020/002659 relates to the use of gel precursors, in particular the employed tetraalkoxysilanes. Tetramethoxysilane (TMOS) has in applicant's earlier work, e.g. as disclosed in WO 2020/002659 and WO 2009/062975, preferably, or even exclusively been used as gel precursor due to its short gelation time. In connection with applicant's work leading to WO 2020/002659, TMOS was thus used as gel precursor in all the disclosed practical examples. WO 2020/002659 makes reference to a single supercritically dried gel produced with TEOS, but without giving any further experimental details.

Applicant has since filing the present application realized that TMOS due to safety considerations should not be considered a relevant gel precursor due to its high toxicity, and TMOS has therefore not been included herein as a potential precursor. Tetraethoxysilane (TEOS) and tetrapropoxysilane (TPOS) are safer alternatives (see eg. NIOSH Pocket Guide to Chemical Hazards (*Pocket Guide to Chemical Hazards|NIOSH|CDC*). Accordingly, the most preferred tetraalkoxysilanes are tetraethoxysilane (TEOS) and tetrapropoxysilane (TPOS).

Based on applicant's work with the freeze-dried loaded gels of the present invention, no particular differences in behavior have been observed vis-a-vis the loaded gels previously prepared using TMOS and supercritical CO2 extraction as disclosed in WO 2020/002659.

It thus appears that using TEOS as gel precursor in combination with freeze-drying as drying method affords loaded aerogels with similar technical characteristics (bulk density, porosity etc.) as loaded aerogels obtained using TMOS as gel precursor in combination with supercritical drying. This similarity must be deemed surprising, as TEOS and TMOS are known from e.g. Sinco (2010) and Zhang (2011) to afford gels with different physical properties like bulk density, percentage of porosity etc.

As discussed hereinabove, it is important that the antifouling composition can absorb enough water to maintain a saturated solution of the active compound in the surface layer of the coating or sealant composition, and this requires a sufficient porosity of the antifouling additive to allow water to penetrate the silica gel lattice and dissolve the encapsulated biocide or biorepellent compound.

Total porosity is defined as the fraction of the bulk loaded aerogel volume that is not occupied by solid matter. Another way of analyzing the porosity of the loaded aerogel is by analyzing the inter- vs. intra-particle pore structure of the material. This is done by mercury intrusion analysis (see the Methods section herein). The interparticle porosity measurement is conducted at relatively low pressure (LP) and gives the medium distance between aerogel particles in µm. The intraparticle porosity is conducted at much higher pressure (HP) and gives the medium diameter of pores inside the aerogel particles in nm. The intraparticle pore size is the most relevant for the water absorption of the loaded gels. The intraparticle pores are referred to as micropores when the diameter is <2 nm, and mesopores for diameters >2 nm.

Due to the high bulk density of the early freeze-dried aerogel samples (FD1-FD4, Table 1 FIG. 5) disclosed in co-pending international application PCT/EP2020/087730, which suggests partial collapse during the freeze-drying of the corresponding wet gels, the development of the freeze-drying methodology has been continued, resulting in the present invention. Whereas the freezing temperature as mentioned above did not affect the porosity to a large extent, it was on the other hand found crucial to keep the temperature during the freeze-drying step below the collapse temperature $T_C$ of the frozen gel whilst the frozen liquid was sublimated.

Much better porosity results could thus be achieved by keeping the temperature below $T_C$ during the sublimation phase. Table 2 (FIG. 6) shows the analysis of six freeze-dried, loaded gels (reference FD5-FD10) initially frozen at −80° C. All gels were again prepared with precondensated TEOS+MTMS (except FD5 (Econea) which was prepared from pure TEOS) and freeze-dried. Table 2 also lists a supercritically dried gel (FD11) containing 75% Econea, which can be compared with the freeze-dried gel FD10.

As can be seen from FIG. 6 (Table 2), the total porosity values of gels FD5-FD10 are consistently >50% and the average bulk density is 0.5 gr/ml, i.e. about half of the value observed for the early freeze-dried samples FD1-FD4, which indicates that collapse of the gels using the conditions of the present invention has been substantially avoided. FD10 and FD11 are both gels with 75% w/w content of Econea, but for comparison dried under freeze-drying or supercritical conditiuons, respectively. As can be seen from Table 2, the total porosities of the two samples are very similar (58.7 vs. 54.6%) whereas in particular the intraparticle (mesopore) diameter differ considerably.

It is further observed that the bulk density for the freeze dried gels varies considerably (FD5-FD10) and depends on both the loading percentage and the density of the pure (unencapsulated) biocide.

It also appears from FIG. 6 (Table 2) that the intraparticle pore (mesopore) diameter for (FD5-FD10) varies considerably more than the total porosity (range: 10.0-62.70 nm, vs. range: 52.9-70.7%) which strongly indicates that both features are essential for a characterization of the freeze-dried, loaded aerogels of the present invention. The difference in variability also indicates that the mesopore diameter of a freeze-dried loaded aerogel according to the present invention cannot be predicted with certainty from a given value of its total porosity.

It is further observed that both the intraparticle (mesopore) pore diameters and total porosity values are significantly higher, and the bulk density values lower than observed for the early freeze-dried samples in FIG. 5 (Table 1).

In a first aspect the present invention thus provides an antifouling additive comprising
a. an inorganic, silica-containing aerogel comprising
b. a porous gel lattice with
   i. a total porosity of at least 40%, and
   ii. a mesopore diameter of at least 10 nm,
c. optionally an alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
d. at least 55% by weight of one or more biocidal or biorepellant compounds selected from 4,5-Dichloro-2-octyl-4-isothiazolin-3-one (DCOIT), 2-(p-chlorophenyl)-3-cyano-4-bromo-5-trifluoromethyl pyrrole (Econea), Zinc ethylenebisthiocarbamate (Zineb), 3-(3, 4-Dichlorophenyl)-1,1-dimethylurea (Diuron), 3-iodo-2-propynylbutylcarbamate (IPBC), 2-tert-butylamino-4-ethylamino-6-methyl-thio-1,3,5-triazine (Terbutryn), 1-(4-chlorophenyl)-4,4-dimethyl-3-(1H-1,2,4-triazol-1-ylmethyl) pentan-3-ol (Tebuconazole), Zinc pyrithione, Tolylfluanid, Dichlofluanid, N,N-Didecyl-N,N-dimethylammonium Carbonate, N,N-Didecyl-N,N-dimethylammonium Bicarbonate, 2-thiazol-4-yl-1H-benzoimidazole (Thiabendazole), 4-[1-(2,3-dimethylphenyl)ethyl]-3H-imidazole (Medetomidine) and mixtures thereof entrapped in said aerogel,
wherein the entrapment of said one or more biocidal or biorepellant compounds takes place during the SOL-GEL formation of the gel, and wherein the SOL-GEL precursor is one or more alkoxysilanes selected from tetraethoxysilane, tetra-n-propoxysilane and alkyltrialkoxysilanes.

As mentioned above the inventors believe that a total porosity of at least 40% is sufficient to achieve the desired water uptake in the final antifouling composition as long as the mesopore diameter is at least 10 nm. The method of the present invention nevertheless also in certain embodiments provides antifouling additives according to the first aspect with a total porosity of at least 50%, such as at least 60%, such as at least 65%, such as at least 70%. In other embodiments of the present invention, the antifouling additive according to the first aspect has a mesopore (i.e. intraparticular) diameter of at least 11 nm, such as at least 12 nm, or such as at least 13 nm.

The freeze-dried, loaded aerogels have moreover been found to have a quite low thermal conductivity (lambda values of 30-75 mW/m*K), see Table 3 for examples (ref. FD7 FD8) hereof. This is surprising, given their high loading of compounds which in neat form (i.e. not encapsulated form) are known to have thermal conductivities on the order of 200-300 mW/m*K (see e.g. Kim 2018 Holberg 2017).

The inventors have in this context also analyzed whether the drying method (supercritical or freeze-drying) has an effect on the thermal conductivity of the loaded aerogels. This seems to be the case, as practically identically prepared samples of loaded, wet gels dried according to either supercritical or freeze-drying conditions were found to have significantly different lambda values (compare SC7 vs. FD7 and SC8 vs. FD8). This is in contrast to the findings of Czlonka et al. who reported that the thermal conductivity of freeze-dried aerogels was only slightly higher than for corresponding supercritically dried aerogels.

Table 3 (FIG. 7) also includes lambda values for two samples of loaded aerogels prepared by supercritical extraction (TC1 and TC2), which values were originally disclosed in co-pending international application PCT/EP2020/087730. The lambda values for these two samples were found to be between 30-40 mW/m*K, which is in good accordance with the lambda values measured for SC7 and SC8.

It is interesting to note in Table 3 (FIG. 7) that the freeze-dried Econea-gel (FD5) has a much lower lambda value (36.6 mW/m*K) than the two other freeze-dried loaded gels (~70 mW/m*K), and also that the porosity of the FD5 gel is quite high (>70%). This particular gel was prepared using pure TEOS, i.e. without addition of MTMS, which clearly has an effect on the gel structure (addition of MTMS leads to a more hydrophobic gel). Also, the loading of this gel is lower (66%) than for the two other samples (75%). These factors very likely all influence the thermal conductivity of the final loaded gel, but have not been investigated further in connection with this application.

It has been reported that the thermal conductivity usually is between 15 and 20 mW/m*K for native ("empty") aerogels, around 30 mW/m*K for "hybrid" (i.e. polymer cross-linked) aerogels with a polymer content <20% by weight, and about 50 mW/m*K for hybrid aerogels with a polymer content >50% by weight (Bertino 2019). It has also been reported that for such hybrid aerogel materials thermal conductivities were in range of 38-66 mW/m*K (White 2016) which is remarkably similar to the findings for the loaded aerogels of the present invention.

The porous structure of the loaded aerogel still isolates the biocide from the surroundings so effectively that the loaded aerogel only has 15-40%, typically at most 30% of the thermal conductivity of the neat, encapsulated biocide.

In preferred embodiments of the present invention, the antifouling additive according to the first aspect has a thermal conductivity which is <100 mW/m*K, such as <90 mW/m*K, such as <80 mW/m*K, such as <75 mW/m*K, such as between 30-75 mW/m*K.

In preferred embodiments the antifouling additive according to the first aspect comprises one or more biocidal or biorepellant compounds selected from Tolylfluanid, Dichlofluanid, N,N-Didecyl-N,N-dimethylammonium Carbonate, N,N-Didecyl-N,N-dimethylammonium Bicarbonate, Zinc ethylenebisthiocarbamate (Zineb), Zinc pyrithione, Copper thiocyanate, 3-(3,4-Dichlorophenyl)-1,1-dimethylurea (Diuron), 4,5-Dichloro-2-octyl-4-isothiazolin-3-one (DCOIT), 3-iodo-2-propynylbutylcarbamate (IPBC), 2-thiazol-4-yl-1H-benzimidazole (Thiabendazole), 2-(p-chlorophenyl)-3-cyano-4-bromo-5-trifluoromethyl pyrrole (Econea), 2-tert-butylamino-4-ethylamino-6-methylthio-1,3,5-triazine (Terbutryn), 1-(4-chlorophenyl)-4,4-dimethyl-3-(1H-1,2,4-triazol-1-ylmethyl)pentan-3-ol (Tebuconazole), 4-[1-(2,3-Dimethylphenyl)ethyl]-3H-imidazole (Medetomidine), or mixtures thereof, see the Examples section.

In preferred embodiments, the antifouling additive of the first aspect comprises aerogel particles which comprise at least 55% by weight encapsulated biocides and/or biorepellants ("active compounds"), such as at least 60% by weight, such as at least 65% by weight, such as at least 70% by weight, at least 75% by weight, at least 80% by weight, at least 85% by weight, at least 90% by weight or about 95% by weight.

To the best of the inventors' knowledge, loaded silica-containing aerogels with the following combination of mandatory features:

a total porosity of at least 40% a mesopore diameter of at least 10 nm, and at least 55% by weight encapsulated materials have not previously been disclosed, and in particular not as freeze-dried solids.

Based on the porosimetry measurements (FIG. 5-7 herein), the two drying methods (supercritical drying and freeze-drying) lead to different aerogel particle morphologies which is also supported by literature such as Li 2020, Zhang 2011 and Dorcheh 2008, discussed hereinabove, but from a technical perspective both types of drying are suitable for producing loaded aerogels having the right combination of features for introduction into anti-fouling coatings and sealants. Freeze-drying, however, may allow for a commercially more attractive scale-up and accommodate an even wider range of biocides/biorepellants whilst still maintaining the original objective of affording loaded aerogel particles which—when formulated into anti-fouling coatings—lead to a satisfactory water absorption of the dry coating.

The loaded gel particles of the present invention thus allow for high amounts of biocides and/or biorepellants ("active compounds") to be added to anti-fouling coatings and sealants, whilst keeping the concomitantly added amount of silica below the 1.5% w/w limit discussed above.

The present invention also provides a method for the production of loaded aerogels according to the first aspect.

In a second aspect the invention thus further provides a method for providing an antifouling additive of the first aspect, comprising the following steps:

a. Prepare the SOL-GEL precursor Solution 1:
   i. 100-450 parts of one or more biocidal or biorepellant compounds is dissolved in 100-500 parts of a lower alcohol such as ethanol. A dispersant may optionally be added. HCl (or another aqueous inorganic acid) can optionally also be added. An alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu can also optionally be added at this point.
   ii. 100 parts tetraalkoxysilan are mixed with 0-50 parts of an alkyltrialkoxysilane.
   iii. Mix the alkoxysilane mixture with the solution of the one or more biocidal or biorepellant compounds.
b. Prepare the catalyst Solution 2:
   100 parts of a lower alcohol such as Ethanol, app. 50 parts water and 0.25-15 parts of a gelling catalyst are mixed.
c. Solution 2 is added gradually to Solution 1 with vigorous stirring. Stirring is continued at reduced speed until signs of gelling are observed. The resulting solution may be transferred into one or more separate containers for gelation.
d. The gel is aged in suitable containers for 2-5 days after which it is frozen, typically at a temperature of −18° C. or lower, such as −80° C., depending on the solvent employed. Before freezing the wet gel, the solvent may be exchanged by another solvent having a higher melting point and preferably a low expansion coefficient such as tert-butanol.
e. The frozen gel is then freeze-dried under a suitable vacuum, keeping a shelf temperature below the collapse temperature $T_C$ for the gel until the frozen solvent has been removed by sublimation. The freeze-dried solid may then undergo a secondary drying phase at elevated temperatures, wherein said one or more biocidal or biorepellant compounds is entrapped in the gel during the SOL-GEL formation of the gel and wherein the SOL-GEL precursor is one or more alkoxysilanes selected from tetraethoxysilane, tetra-n-propoxysilane and alkyltrialkoxysilanes.

For the preparation of Solution 1 and 2, ethanol or another $C_1$-$C_4$ alcohol can conveniently be used as solvent. The gelling catalyst may be either basic or acidic in nature, depending on the specific biocide.

The collapse temperature $T_C$ is defined at the temperature at which the material softens to the point of not being able to support its own structure. $T_C$ is often close to the glass transition temperature Tg', defined as the temperature at which the frozen material changes from a brittle to a flexible structure. Freeze drying microscopy (FDM) can be used to identify temperatures at which visible changes occur for a specific frozen gel. FDM measurements can thus be used to optimize the specific freeze-drying cycle such that the product temperature is maintained below the lowest critical temperature identified with a reasonable safety margin. In the absence of $T_C$ measurements, the freezing point of the employed solvent may be used as a target temperature.

Embodiments of the present invention thus provide methods for the production of freeze-dried, loaded aerogels with a total porosity >40%, a mesopore diameter of at least 10 nm and a loading of at least 55% by weight of a biocidal or biorepellent compound.

According to embodiments of the methods of the invention, after completion of the SOL-GEL gelation process, the solvent within the wet gel—optionally after suitable solvent exchange where the solvent of wet gel is replaced by another solvent with a low expansion coefficient and a high sublimation pressure—is frozen. The frozen gel is then placed in a vacuum chamber within a freeze-dryer where the solvent is removed by sublimation at a temperature below the collapse temperature, $T_C$. These two steps can be accommodated in a commercial freeze-dryer.

The temperature during the sublimation phase is kept sufficiently low to avoid melting of the frozen solvent, preferably below the collapse temperature $T_C$ for the frozen wet gel, as assessed e.g. by freeze drying microscopy (FDM). It has been found important to conduct the sublimation below the collapse temperature $T_C$ in order to provide loaded aerogels with the desired combination of total porosity, mesopore diameter and achievable high loading described in the first aspect of the present invention. The collapse temperature $T_C$ is a parameter which must be assessed for the individual gel, using standard methodology well known to the skilled person, such as freeze-drying microscopy. If unavailable, $T_C$ may be replaced by the freezing point of the employed solvent as a target temperature.

The described procedure has several advantages over supercritical drying, including a reduction in hazard risks posed by drying at supercritical conditions as well as the ability to up-scale the process for commercial purposes without introducing risk. A second advantage of the invention is a substantial reduction in capital expenditures. Autoclaves used for supercritical drying require thick walls and pose liability issues because of the high pressures (on the order of 70 atmospheres) used in supercritical drying. Freeze drying uses vacuum chamber(s) instead which are much cheaper to produce and pose minimal liability issues. Typically, a supercritical drying autoclave costs 10 times more than a freeze-drying vacuum chamber of the same capacity.

Finally, freeze-drying allows the preparation of loaded aerogels containing biocidal and/or biorepellent compounds which under the conditions of supercritical drying would be partially or substantially removed from the wet gel due to leaching of the encapsulated biocide during the solvent exchange with supercritical $CO_2$. Freeze-drying may thus for some biocides allow for a higher yield of loaded aerogel.

The manufacturing method of the present invention thus satisfactorily adresses the limitations known in the prior art for the production of loaded aerogels.

In an embodiment of the manufacturing procedure, Solution 1 contains 20-50 parts alkyltrialkoxysilane. In another embodiment, in particular if a hydrophilic loaded aerogel is envisaged or a very high loading of biocide is required, Solution 1 contains less than 20 parts alkyltrialkoxysilane, such as 15 parts, or such as 10 parts, or such as 5 parts or less. In another embodiment, Solution 1 contains no alkyltrialkoxysilane.

For the present application tetramethoxysilane (TMOS) was included as an optional tetraalkoxysilane gel precursor at the time of filing, although no practical examples of using TMOS were included. Applicant has since realized that TMOS due to safety considerations should not be considered a relevant gel precursor due to its high toxicity. Tetraethoxysilane (TEOS) and tetrapropoxysilane (TPOS) are safer alternatives (see eg. NIOSH Pocket Guide to Chemical Hazards (*Pocket Guide to Chemical Hazards|NIOSH|CDC*). Accordingly, the most preferred tetraalkoxysilanes are tetraethoxysilane (TEOS) and tetrapropoxysilane (TPOS).

In another preferred embodiment the pre-hydrolysed/pre-condensated tetraalkoxysilane is selected from pre-hydrolysed tetraethylorthosilicate (eg. Dynasylan® A) or pre-hydrolysed tetra n-propylorthosilicate (eg. Dynasylan® P).

In a preferred embodiment the alkyltrialkoxysilane is selected from MTMS (methyltrimethoxysilane) and MTES (methyltriethoxysilane), but other lower alkyltrialkoxysilanes such as TMES (trimethylethoxysilane) and ETES (ethyltriethoxysilane) may also be employed.

The gelling catalyst can be any conveniently used catalyst for aerogel formation, such as aqueous ammonia (conveniently concentrated aq. NH3 or 25% in water). Other applicable gelling catalysts include ammonium fluoride, sodium fluoride and sodium carbonate. Such alternative catalysts are preferred in cases where the biocide may react with ammonia. Acidic catalysis can also be used, such as e.g. with hydrochloric acid, in particular in cases where the biocide to be entrapped is sensitive to ammonia or alkaline conditions in general.

Examples of using various versions of the generic method can be found in the Experimental section.

It is known (e.g. from Dorcheh 2008) that the surface of chemically unmodified aerogel particles prepared from tetraalkoxysilanes and dried with the supercritical CO2 will only contain hydroxyl (Si—OH) terminal groups. The original alkoxy (Si—OR) groups are apparently hydrolyzed under the process conditions (several hours at ~40° C. and 110 bars in a supercritical fluid phase system). This is different from the freeze-drying process, where the very low temperatures (−80° C.) and the solid phase (frozen gel) system effectively prevent any reactions of the terminal groups. Thus, chemically unmodified aerogels dried with CO2 under supercritical conditions will differ from freeze-dried aerogels not only by having different bulk density, porosity etc. discussed above, but also in that the terminal groups on the surfaces of the two types of aerogels will not be identical. Aerogels dried with CO2 under supercritical conditions will typically have surfaces mainly covered with silanol (Si—OH) terminal groups, whereas aerogels prepared by freeze-drying typically will present a mixture of silanol (Si—OH) and alkoxysilane (Si—OR) terminal groups.

Thus, the manufacturing process, both when considering the gel precursor and the drying step, will directly influence important product parameters such as the porosity, bulk density and surface structure of the final product. It is therefore justified to define the products of the present invention in terms of the process of manufacture.

In a third aspect there is thus provided an antifouling additive obtainable by the method according to the second aspect.

In preferred embodiments the invention provides an antifouling additive according to the first or third aspect of the invention, which comprises one or more biocidal or biorepellant compounds selected from the group consisting of: pyrithione compounds, basic copper carbonate, isothiazolinone compounds, substituted triazines, carbamates, chlorinated aromatic ureas, triazoles and combinations thereof. Examples of pyrithione compound include metal pyrithione compounds such as zinc pyrithione, zirconium pyrithione, sodium pyrithione and the like. Examples of isothiazolinone compounds include, for example: 4,5-Dichloro-2-n-octyl-4-isothiazolin-3-one (DCOIT), 1,2-benzisothiazolin-3-one (BIT), n-butyl isothiazolinone (BBIT), n-octyl isothiazolinone (OIT) and mixtures thereof. Substituted triazines include, for example, Terbutryn (2-tert-butylamino-4-ethylamino-6-methylthio-1,3,5-triazine). Carbamates include, for example iodopropynyl butylcarbamates (IPBC). Chlorinated aromatic ureas, include, for example, diuron (dichlorophenyl dimethylurea). Of the pyrithione compounds, generally, zinc pyrithione is used from the standpoint of cost and effectiveness. Depending on the intended use of the encapsulated biocidal or biorepellant compound, those skilled in the art would be able to determine which active ingredients could be used in the present invention.

As used herein, the term "biocidal or biorepellant compounds" is intended to mean an ingredient which has biocidal or biorepellant properties, including, but not limited to active ingredients that are antimicrobial, sporicidal, fungicidal and the like.

The intended use of the anti-fouling additive of the present invention is to be added to an anti-fouling coating or sealant composition to be applied for wood protection (fences, buildings etc.), marine use (boats, pleasure yachts, commercial vessels, static constructions submerged in water such as oil rigs and other off-shore constructions etc.) and humid indoor environments such as bathrooms, toilets, saunas, gyms, indoor swimming pool areas etc. which are naturally/regularly exposed to humid conditions and/or water.

When the prepared aerogel particles are included in an anti-fouling coating or sealant, the encapsulated active compound is distributed uniformly in the resulting layer. Each aerogel particle may contain several discrete particles of active compound (FIG. 3).

Further, as demonstrated by the non-limiting examples herein, the disclosed procedure for producing freeze-dried, loaded aerogels have been found to work well for a wide variety of structurally quite different biocidal and/or biorepellent compounds.

Using the manufacturing procedure of the present invention, the inventors have produced loaded aerogels with a variety of biocides, such as 4,5-Dichloro-2-octyl-4-isothiazolin-3-one (DCOIT), 2-(p-chlorophenyl)-3-cyano-4-bromo-5-trifluoromethyl pyrrole (Econea), Zinc ethylenebisthiocarbamate (Zineb), 3-(3,4-Dichlorophenyl)-1,1-dimethylurea (Diuron), 3-iodo-2-propynylbutylcarbamate (IPBC), 2-tert-butylamino-4-ethylamino-6-methylthio-1,3,5-triazine (Terbutryn), 1-(4-chlorophenyl)-4,4-dimethyl-3-(1H-1,2,4-triazol-1-ylmethyl)pentan-3-ol (Tebuconazole), Zinc pyrithione, Tolylfluanid, Dichlofluanid, N,N-Didecyl-N,N-dimethylammonium Carbonate, N,N-Didecyl-N,N-dimethylammonium Bicarbonate, 2-thiazol-4-yl-1H-benzoimidazole (Thiabendazole), and mixtures thereof, see the Examples section.

In preferred embodiments, the antifouling additive of the first aspect comprises aerogel particles which comprise at least 55% by weight encapsulated biocides and/or biorepellants ("active compounds"), such as at least 65% by weight, such as at least 70% by weight, at least 75% by weight, at least 80% by weight, at least 85% by weight, at least 90% by weight or about 95% by weight.

Upon formulation in anti-fouling coatings and sealants, the freeze-dried, loaded aerogel particles of the present invention lead to a satisfactory water absorption. The particles have thus been found to be valuable as anti-fouling additives to be used in anti-fouling coatings and sealants, both for off-shore and on-shore purposes.

In a fourth aspect there is therefore provided the use of an antifouling additive according to the first or third aspect, in marine coatings or coatings intended for wood protection or for humid environments.

The anti-fouling additives of the present invention are thus well-suited for formulation into coatings to be applied on off-shore surfaces which are regularly or constantly submerged in water. Examples of surfaces which are regularly or constantly submerged in water include the hull of boats, ships, and other vessels, including both commercial tankers, pleasure boats and yachts, but also static constructions such as swimming pools, rainwater basins, harbor constructions, oil rigs and fish-farming constructions such as aquaculture nets, which comprise construction parts that are constantly submerged. Biofouling of aquaculture nets causes serious maintenance and operational problems, see e.g. Swain 2014. The direct economic cost to the aquaculture industry of controlling biofouling has been estimated to be 5%10% of production cost. It has been reported that after only a few months of immersion, biofouling can increase the weight of the netting by as much as two-hundred-fold, and the drag force five-fold. Historically, this additional weight and drag has led to the collapse or failure of several large commercial marine aquaculture structures. Fouling also causes a reduction of the mesh opening and decrease in water circulation through the cage. This results in a significant reduction in carrying capacity and may lead to increased mortalities of the fish. Biofouling may also act as a reservoir for parasites and disease and certain fouling species, such as hydroids and anemones, are capable of inflicting harm through nematocysts that will sting and irritate the skin. At present, net fouling is typically controlled either by changing and cleaning the nets or by using chemical antifoulants that contain biocides such as cuprous oxide, copper isothiocyanate, copper pyrithione, zinc pyrithione, zinc oxide, Econea and others. Whilst the use of untreated nets is safe for the environment, the frequent cleaning and replacement of nets causes stress to the animals, damages the nets, increases maintenance costs, and decreases profit margins. The anti-fouling additives of the present invention when formulated into coatings are well-suited to be applied to aquaculture nets, which—due to the controlled release of biocide from the loaded aerogel particles of the invention—ensures a protracted biocidal protection of the nets and minimizes the need for biocide.

Examples of surfaces which are only regularly submerged in water include static marine constructions such as the lower part of ocean windmill pylons and other off-shore constructions, piers and harbor constructions which experience regular periods of submerging during high tide or through flooding by waves.

The anti-fouling additives of the present invention have also been found useful for coatings and sealants to be applied on on-shore surfaces which are regularly exposed to humid air and rainfall. Such surfaces are typically found on houses and other buildings located in tropical areas or near the ocean and areas which experience frequent rainfalls or dense fogs. Other examples include indoor surfaces of rooms which regularly experience exposure to high air humidity, such as bathrooms, showers, saunas, and indoor swimming pools. For such humid indoor environments, a particular use of the anti-fouling additives of the present invention has been found in sealants e.g. to be used to fill cracks between tiles and the like, which are often attacked by mold and mildew.

In a fifth aspect there is provided an antifouling coating or sealant composition comprising the antifouling additive according to the first or third aspect of the present invention.

An antifouling coating layer on a ship hull or other "marine surfaces" typically has a thickness of around 100 μm, whereas a sealant is applied in much higher thickness. In both cases, however, when the anti-fouling composition is exposed to humid conditions, as discussed hereinabove, a layer of approximately 20-40 μm in thickness is gradually developed which has absorbed water from the surroundings (Bressy C. et al. "Tin-free self-polishing marine antifouling coatings" Woodshead Publishing, 2009) and which has been made porous by the dissolution of copper oxide particles in the coating. The thickness of this layer depends on the type of anti-fouling coating or sealant composition: solvent based compositions as a rule absorb water less readily than water-borne compositions. This "wetted" layer is referred to as the leaching layer, as it is from this layer of the cured composition that the biocidal active compound(s) are dissolved and transported by diffusion to the surface.

The aerogel particles embedded in the leaching layer of the coating or sealant start absorbing water due to the porous and hygroscopic nature of silica-based aerogels. This creates a local aqueous environment inside the exposed aerogel particles around the entrapped active compound particles, which slowly start dissolving. After a while a saturated solution of the active compound is created inside the aerogel particle (FIG. 4).

This saturated solution then serves as a reservoir of active compound, and release hereof to the surface of the anti-fouling coating or sealant occurs when the active compound permeates the porous structure of the aerogel particle and out onto the surface of the anti-fouling coating or sealant. The leaching layer is constantly renewed by erosion of the upper part of the layer due to either passage of the coated surface through water or exposure to (for static outdoor applications) rain, sunshine, and temperature fluctuations. For indoor applications the erosion will be caused by regular exposure to water, such as in showers, and physical cleaning of the surfaces, also with detergents, where the anti-fouling composition has been applied. Whilst the leaching layer is thereby reduced in thickness by erosion from the top, it is simultaneously renewed by inclusion of deeper lying areas of the anti-fouling composition layer.

For on-shore coatings, a similar porous layer as the above "leaching layer" is also gradually developed. The mechanism for developing this layer is different from coatings on marine surfaces and depends i.a. on the well-known ability of silica to swell and shrink upon adsorption/desorption of water, which happens as a function of variations in ambient humidity, fluctuating temperature and incident sunlight during the day. This dynamic behavior leads the surface layer of on-shore anti-fouling coatings (containing the aerogel particles of the present invention) to erode, initially on the microscopic level, thereby allowing ambient humidity, dew, rainfall, melting snow etc. to penetrate the coating and access the aerogel particles. This leads over time to a saturated solution of biocide being produced which diffuses out of the aerogel particle and onto the surface of the coating (similar to coatings on marine surfaces).

In the following the "leaching layer" concept and terminology will therefore be used for both "marine situations" and on-shore coatings.

The erosion and renewal of the leaching layer secures that for the full service life of the dry anti-fouling composition there is always sufficient amounts of biocide present to maintain the desired anti-fouling effect on the surface of the dry anti-fouling composition.

When the leaching layer is eroded, the embedded aerogel particles become gradually exposed to the environment.

However, even when partially exposed, the aerogel particles remain stuck (together with their remaining content of biocide) in the anti-fouling composition until they are eventually removed by erosion of the coating or sealant as discussed above.

This is an important difference vis-à-vis the situation shown in FIG. 1, which illustrates that non-entrapped biocide particles are lost from the coating long before they have fully been used to exert an anti-fouling effect. As long as there remains undissolved active compound present inside the aerogel particles, thereby ensuring a saturated reservoir of dissolved active compound, release to the surface will take place with substantially zero order kinetics. The release profile over time is in other words substantially linear.

The concentration of the biocide/biorepellant on the surface of the anti-fouling coating is thus kept practically constant during the expected service life of the coating or sealant, as long as the surface is regularly exposed to humidity such as humid air, in particular air having a relative humidity of >65%, rain or contact with a body of water.

If more than one biocide/biorepellant is required, each active compound can be individually encapsulated and included in the anti-fouling composition in the correct ratio, thus securing that the individual active compounds do not interact with each other during storage, and that a constant ratio between the released compounds from the final coating or sealant is maintained during its expected service life.

In preferred embodiments, the present invention provides antifouling coating compositions comprising an amount of antifouling additive according to current invention, which corresponds to at least 0.1%, such as to at least 0.5%, such as to at least 1% w/w, such as to at least 1.25% w/w, such as to at least 1.5% w/w, such as to at least 2% w/w biocide, such as to at least 3% w/w biocide, such as to at least 4% w/w biocide, such as to at least 5% w/w biocide, such as to at least 6% w/w biocide, such as to at least 7% w/w biocide.

In a further embodiment of the present invention, an anti-fouling coating is provided which comprises two or more different biocides and/or biorepellants, encapsulated individually in different aerogels, which are then added to the anti-fouling composition in the required ratio.

The procedure described herein has been found to work well for many distinctly different chemical structures, such as pyrithiones, isothiazoles and isothiazolones, triazoles, imidazoles and benzimidazoles, halogenated pyrroles, ureas, carbamates, sulfamides, and zinc and copper salts such as zinc thiocarbamate, copper thiocyanate, copper (II) hydroxide and copper(II) carbonate-copper(II) hydroxide (1:1) and metallic copper.

In one embodiment the encapsulated biocidal or biorepellant compound is selected from pyrithiones of formula:

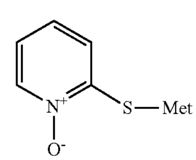

wherein Met is a metal chosen from Copper, Zinc, Zirconium, or Sodium.

In a preferred embodiment the encapsulated biocidal or biorepellant compound is selected from Zinc pyrithione or Sodium Pyrithione.

In another embodiment the encapsulated biocidal or biorepellant compound is selected from isothiazoles of formula:

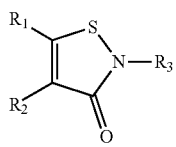

wherein $R_1$ and $R_2$ may be halogen or hydrogen, or $R_1$ and $R_2$ may be fused to form an optionally further substituted aromatic ring and $R_3=C_3-C_{12}$ alkyl.

In a specific embodiment the biocidal or biorepellant compound is selected from 2-butylbenzo[d]isothiazol-3-one (BBIT), 2-octyl-2H-isothiazol-3-one (OIT) or 4,5-Dichloro-2-octylisothiazol-3(2H)-one (DCOIT).

In another embodiment the encapsulated biocidal or biorepellant compound is selected from triazoles of formula:

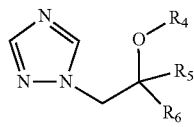

wherein $R_4$=hydrogen, $C_1-C_6$ alkyl, $R_5=C_1-C_6$ alkyl, $C_1-C_6$ alkyloxy, $R_6$=aryl, $C_1-C_6$ arylalkyl and wherein $R_4$ and $R_5$ may be fused to form a 5-6 membered ring containing at least one oxygen.

In a specific embodiment the biocidal or biorepellant compound is selected from 1-(4-chlorophenyl)-4,4-dimethyl-3-(1,2,4-triazol-1-yl-methyl)pentan-3-ol (Tebuconazole), 1-[[2-(2,4-dichlorophenyl)-4-propyl-1,3-dioxolan-2-yl]methyl]-1H-1,2,4-triazole (Propiconazole), or (2RS,3RS; 2RS,3SR)-2-(4-chlorophenyl)-3-cyclopropyl-1-(1H-1,2,4-triazol-1-yl)butan-2-ol (Cyproconazole).

In another embodiment the encapsulated biocidal or biorepellant compound is selected from triazines of the general formula:

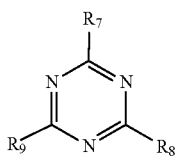

wherein $R_7=C_1-C_6$ alkylthio, $R_8=C_1-C_6$ alkylamino and $R_9=C_1-C_6$ alkylamino.

In a preferred embodiment the biocidal or biorepellant compound is 2-ethylamino-6-methylthio-4-tert-butylamino-1,3,5-triazine (Terbutryn).

In another embodiment the encapsulated biocidal or biorepellant compound is selected from imidazoles of the general formula:

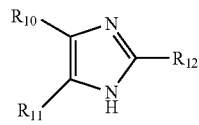

wherein $R_{10}$ and $R_{11}$ may be hydrogen, $C_1-C_6$ alkyl or $C_1-C_3$ arylalkyl, or be fused to form a benzimidazole ring, and $R_{12}$=hydrogen, heteroaryl or carbamoyl.

In a specific embodiment the biocidal or biorepellant compound is selected from 2-thiazol-4-yl-1H-benzoimidazole (Thiabendazole), (RS)-4-[1-(2,3-Dimethylphenyl)ethyl]-3H-imidazole (Medetomidine) and Methyl 1H-benzimidazol-2-ylcarbamate (Carbendazim).

In another embodiment the encapsulated biocidal or biorepellant compound is selected from halogenated pyrroles of the general formula:

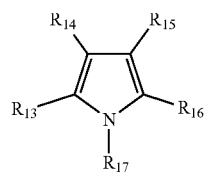

wherein $R_{13}$=Aryl, $R_{14}$=halogen, cyano, trifluoromethylsulfonyl, $R_{15}$=halogen, trifluoromethylthio, $R_{16}$=cyano, trifluoromethyl, halogen, $R_{17}$=hydrogen, $C_2-C_6$ alkyloxymethyl,
wherein at least one of $R_{14}$, $R_{15}$ and $R_{16}$ is halogen.

In specific embodiments the biocidal or biorepellant compound is selected from 4-Bromo-2-(4-chlorophenyl)-5-(trifluoromethyl)-1H-pyrrole-3-carbonitrile (Tralopyril) and 4-bromo-2-(4-chlorophenyl)-1-ethoxymethyl-5-trifluoromethylpyrrole-3-carbonitrile (Chlorfenapyr).

In another embodiment the encapsulated biocidal or biorepellant compound is selected from carbamates, ureas or sulfamides of the general formula:

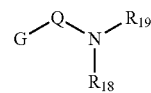

wherein Q=carbonyl (C=O) or sulfonyl (O=S=O), $R_{18}$=aryl, $C_1-C_8$ alkyl, hydrogen and $R_{19}=C_1-C_6$ alkyl, hydrogen, G=O—$R_{20}$ or $N(R_{21}R_{22})$ wherein $R_{20}=C_3-C_6$ alkynyl, $C_1-C_6$ alkyl, $R_{21}=C_1-C_8$ alkyl, trihalomethylthio, hydrogen and $R_{22}=C_1-C_8$ alkyl, aryl, hydrogen.

In a further embodiment the biocidal or biorepellant compound is selected from carbamates, ureas or sulfamides of the below three general formulae, respectively:

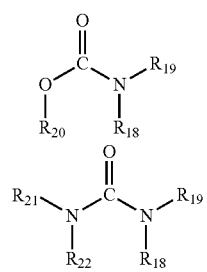

-continued

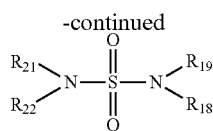

wherein $R_{18}$=aryl, $C_1$-$C_8$ alkyl, hydrogen and $R_{19}$=$C_1$-$C_6$ alkyl, hydrogen, $R_{20}$=$C_3$-$C_6$ alkynyl, $C_1$-$C_6$ alkyl, $R_{21}$=$C_1$-$C_8$ alkyl, trihalomethylthio, hydrogen and $R_{22}$=$C_1$-$C_8$ alkyl, aryl, hydrogen.

In specific embodiments the biocidal or biorepellant compound is selected from 3-(3,4-dichlorophenyl)-1,1-dimethylurea (Diuron), Dichloro-N-[(dimethylamino)-sulphonyl]-fluoro-N-(ptolyl)-methanesulphenamide (Tolylfluanid), N-(Dichlorofluoromethylthio)-N',N'-dimethyl-N-phenylsulfamide (Dichlofluanid), 3-iodo-2-propynyl butylcarbamate (Iodocarb).

In yet another embodiment the encapsulated biocidal or biorepellant compound is selected from zinc and copper salts such as zinc thiocarbamate, copper thiocyanate, copper (II) hydroxide and copper(II) carbonate-copper(II) hydroxide (1:1), and metallic copper.

In particularly preferred embodiments, the encapsulated biocidal or biorepellant compound is selected from Tolylfluanid, N,N-Didecyl-N,N-dimethylammonium Carbonate, N,N-Didecyl-N,N-dimethylammonium Bicarbonate, Zinc pyrithione, Diuron, 4,5-Dichloro-2-octyl-4-isothiazolin-3-one (DCOIT), 3-iodo-2-propynylbutylcarbamate (IPBC), 2-thiazol-4-yl-1H-benzoimidazole (Thiabendazole), 2-(p-chlorophenyl)-3-cyano-4-bromo-5-trifluoromethyl pyrrole (=Econea or Tralopyril) or mixtures thereof.

EXPERIMENTAL

Materials Used in the Aerogel Syntheses.

Gel forming materials are selected from metal oxides based on Si, Ti, Fe and Al such as tetraethylorthosilicate (TEOS, tetraethoxysilane) or tetra-n-propylorthosilicate (TPOS, tetrapropoxysilane). To make a more hydrophobic material methyltrimethoxysilane (MTMS or similar) can be included. Pre-polymerised (pre-hydrolysed, precondensated) tetraalkoxysilanes are either commercially available or can be produced by hydrolysis of the relevant tetraalkoxysilane under weakly acidic conditions followed by polymerization at low temperature overnight.

General Methods Used for Preparing Aerogels with Encapsulated Biocides/Biorepellants.

To accommodate for a broad selection of biocides/biorepellants which have different solubilities and tolerance towards acidic or alkaline conditions, and for allowing the use of different combinations of tetraalkoxysilanes and alkyltrialkoxysilanes, the following methods have been developed for the production of the encapsulated biocides/biorepellants of the present invention.

Original Recipe (WO 2020/002659) Dynasylan M/TMOS Gels (Used for Encapsulating Compounds Having a Low Solubility in Ethanol/Alcohol, e.g. CPT, ZPT, Zineb, Diuron)

1. Dynasylan M, MTMS (with or without) and EtOH are mixed 10 minutes on a magnetic stirrer. Add biocide and mix vigorously for approx. 5 min or until a homogenous mixture is achieved.
3. $NH_4OH$ is mixed with EtOH+water and added with stirring to the biocide mixture.
4. The stirring speed is reduced until the reaction mixture becomes bulky like a pudding, which takes app. 15-25 minutes.
5. The container is closed, and a small amount of ethanol is added on top of the gel to avoid drying. The material is left to mature for app. 3 days (can be done in the fridge).
6. This recipe was typically used in connection with supercritical extraction. To enable freeze-drying, the ethanol in the wet gel is substituted by an alcohol with a higher melting point, such as tert-butanol.
7. The wet gel is subsequently frozen and free-dried according to the general procedure here.

Gel Preparation—Ammonium Fluoride—Gels with TEOS/Dynasylan a (e.g. CPT, ZPT, Zineb, Diuron, Econea)

Stock Solution Preparation

Weigh 1.852 g $NH_4F$ and add it to 100 mL of water. Add 20.50 g (22.78 mL) ammonium hydroxide solution. This is referred to as the "ammonium fluoride/ammonium hydroxide stock solution". "catalyst base").

Gel Preparation

1. Mix Dynasylan A/TEOS and ethanol in a jar. Allow it to mix for 10 minutes. This is referred to as the "alkoxide solution".
2. Add biocide to the alkoxide solution. Stir for 5-15 minutes or until homogeneous.
3. Mix water and ethanol in another container. Add ammonium fluoride/ammonium hydroxide stock solution. This is referred to as the "catalyst solution".
4. Pour the catalyst solution into the alkoxide solution and stir. This is the "sol".
5. Stir vigorously until the gelling starts to take place. Reduce mixing speed when the sol-gel becomes thick. Gel time is approximately 8-40 min. Gelling time depends on alcohol/water ratio and (DynA+MTMS) to (water+ethanol) ratio. Transfer the wet gel to a mould or container for storage and aging.
6. Close the container and leave the material to mature for approx. 3 days (can be done in the fridge).

Gel Preparation—Reversed Order with a High Water Ratio (for e.g. Iodocarb, Terbutryn, Tolylfluanid, Due to Ethanol Solubility/Miscibility)

1. Mix water, ethanol, dispersant (and antifoam) in a jar. Allow it to mix for 10 minutes on magnetic stirrer.
2. Add biocide. Stir for 10 minutes
3. Mix TMOS and MTMS in another container.
4. Pour the TMOS/MTMS mixture into the EtOH/water biocide solution and stir for 5-15 minutes or until homogeneous.
5. Add $NH_4OH$-base catalyst.
6. Stir vigorously until the gelling starts to take place. Reduce mixing speed when the sol-gel becomes thick. Transfer the wet gel to a mould or container for storage.
7. Close the container and leave the material to mature for approx. 3 days (can be done in the fridge).
8. The wet gel is subsequently frozen and freeze-dried according to the general procedure herein.

Gel Preparation—Acidic Catalysis (Required e.g. for DCOIT which is Sensitive to Alkaline Conditions)

1. Mix water, ethanol, dispersant in a jar with mechanical stirring for about 10 minutes.
2. Add HCL and mix 10 minutes.
3. Add biocide. Stir for 10 minutes
4. Mix Dynasylan A and MTMS in another container.
5. Pour the DynA/MTMS into the EtOH/water solution/biocide and stir for 5-15 minutes or until homogenous.
6. Add $NH_4OH$-base catalyst.

7. Stir vigorously until the gelling starts to take place. Reduce mixing speed when the sol-gel becomes thick. Transfer the wet gel to a mould or container for storage.
8. Close the container and leave the material to mature for approx. 3 days (can be done in the fridge).
9. The wet gel is subsequently frozen and freeze-dried according to the general procedure herein.

General Drying Methods Including Solvent Exchange

Depending on the composition of the SOL phase, the solvent in the wet gel may be exchanged with tert-butanol (4×the volume of gel, 3 times every 4 h) before freeze drying. For wet gels containing a high ratio of water, solvent exchange is not required before freezing. For wet gels containing a high ratio of ethanol, solvent exchange with tert-butanol before freezing allows for subsequent freeze-drying at a higher temperature, which is preferred for larger scale operation.

Freeze drying can be carried out in a commercial freeze dryer (e.g. VirTis), as follows:

The wet gel is frozen e.g. at −18° C. or −80° C. in a commercial refrigerator and freeze-dried at a shelf temperature about 5 degrees lower than the collapse temperature $T_C$ of the specific frozen gel (the $T_C$ can be assessed e.g. by freeze-drying microscopy, FDM, see the Methods section), and at a pressure <3 Torr. It is advantageous to establish the collapse temperature $T_C$ of the gel prior to commencing freeze-drying of the frozen wet gels of the invention, as knowledge of the $T_C$ enables developing the most cost-effective freeze-drying process. However, if $T_C$ is unknown for a particular gel, the part of the chamber hosting the sample should be kept at temperatures about 5 degrees lower than the freezing point of the solvent/solvent mixture in the wet gel, which may be easier to establish. The frozen gel is then freeze-dried maintaining a temperature below the collapse temperature $T_C$, or alternatively, below the freezing point of the employed solvent. During the drying process the temperature can slowly be raised.

NON-LIMITING EXAMPLES

In the following some non-limiting examples are given of how the loaded aerogels of the present invention are produced.

Gel Example 1 (Reference Example). Preparing an Aerogel with App. 75% Encapsulated CuPT from Pre-Condensed TEOS (or Pure TEOS)

Step 1. Solution 1: 28.16 g pre-condensed TEOS (or pure TEOS), 13.35 g of MTMS and 115.2 g Ethanol (96.6%) were stirred with a mechanical stirrer in a glass container for approx. 15 minutes. 48.64 g Copper pyrithione was added with mixing. The solution was mixed for additional 15 minutes.

Step 2. Solution 2: 1.28 g Ethanol (96.6%), 76.8 g Water (demineralised) and 3.71 g of catalyst base (weigh 1.852 g NH$_4$F and add it to 100 mL of water. Add 20.50 g (22.78 mL) ammonium hydroxide solution. This is the "catalyst base").

Step 3. Solution 2 was added to solution 1 during mixing at full speed on the mechanical stirrer. After about 30 minutes of mixing the gelation took place. The obtained gel was aged for approx. 3-5 days before drying.

Step 4. The aged gel was frozen in an industrial freezer at −80° C. overnight and then freeze-dried at a pressure of <10 mbar and a condensor temperature of −110° C. Yield: app. 63 gr.

For porosimetry comparison purposes the same wet gel was prepared and dried under supercritical conditions. Thus, the wet gel from step 3) was cut into smaller pieces and transferred under ethanol to a ½ L pressure vessel (½ L flow reactor, equipped with heating jacket and metal frits in both ends). The temperature in the heating jacket was raised to 37-40° C. and the pressure raised to 100 bars, at a rate of 3 bars/min. For approx. 4 hours at 40° C. and 100 bars, 2½ kg of CO2 was flowed through the vessel at a rate of approximately 6 mL/min. After flowing the pressure was slowly released during 2 hours. The weight of the supercritically dried aerogel was approx. 50 g.

Gel Example 2. Preparing an Aerogel with App. 75% Encapsulated Zineb from Precondensated TEOS (or Pure TEOS)

Step 1. Solution 1: 28.16 g pre-condensed TEOS (or pure TEOS), 13.35 g of MTMS and 115.20 g Ethanol (96.6%) was stirred with a mechanical stirrer in a glass container for approx. 15 minutes. 48.64 g Zineb was added with mixing. The solution was mixed for additional 15 minutes.

Step 2. Solution 2: 1.28 g Ethanol (96.6%), 76.8 g Water (demineralised) and 3.71 g of catalyst base (see Reference Example 1).

Step 3. Solution 2 was added to solution 1 during mixing at full speed on the mechanical stirrer. The gelation took place after additionally 30 minutes of mixing. The obtained gel was aged for approx. 3-5 days, before drying.

Step 4. The aged gel was frozen in an industrial freezer at −80° C. overnight and then freeze-dried at a pressure of <10 mbar and a condensor temperature of −110° C. Yield: app. 70 gr.

For porosimetry comparison purposes the same wet gel was prepared and dried under supercritical conditions. Thus, the wet gel from step 3) was cut into smaller pieces and transferred under ethanol to a ½ L pressure vessel (½ L flow reactor, equipped with heating jacket and metal frits in both ends). The temperature in the heating jacket was raised to 37-40° C. and the pressure raised to 100 bars, at a rate of 3 bars/min. For approx. 4 hours at 40° C. and 100 bars, 2½ kg of CO2 was flowed through the vessel at a rate of approximately 6 mL/min. After flowing the pressure was slowly released during 2 hour. The weight of the supercritical dried aerogel was approx. 65 g.

Gel Example 3. Preparing an Aerogel with App. 66% Encapsulated Tralopyril (Econea) from Pre-Condensed TEOS (or Pure TEOS)

Step 1. Solution 1: 31.24 g pre-condensed TEOS (or pure TEOS) and 56.9 g Ethanol (95%) was stirred with a mechanical stirrer in a glass container for approx. 10 minutes. 24 g Econea was added with mixing. The solution was mixed for additionally 10 minutes.

Step 2. Solution 2: 20 g Ethanol (95%), 45.98 g Water (demineralised) and 1.2 g of catalyst base (see Reference Example 1).

Step 3. Solution 2 was added to solution 1 during mixing at full speed on the mechanical stirrer. The gelation took place after additionally 20 minutes of mixing. The wet gel was moved to a container with a lid. The obtained gel was aged for approx. 3-5 days, before drying.

Step 4. The aged gel was frozen in an industrial freezer at −80° C. overnight and then freeze-dried at a pressure of <10 mbar and a condensor temperature of −110° C. Yield: 33.4 gr For porosimetry comparison purposes the same wet gel was prepared and dried under supercritical conditions. Thus, the wet gel from step 3) was cut into smaller pieces and transferred under ethanol to a ½ L pressure vessel (½ L flow reactor, equipped with heating jacket and metal frits in both ends). The temperature in the heating jacket was raised to 37-40° C. and the pressure raised to 100 bars, at a rate of 3 bars/min. For approx. 4 hours at 40° C. and 100 bars, 2½ kg of $CO_2$ was flowed through the vessel at a rate of approximately 6 mL/min. After flowing the pressure was slowly released during 2 hour. The weight of the supercritical dried aerogel was approx. 36 g.

Gel Example 4. Preparing an Aerogel with App. 56% Encapsulated DCOIT

Step 1. 112 g water (demineralised), 6.5 g ethanol (96.6%), 1.1 g dispersant (e.g. Tego dispers 740W) were mixed in a jar with mechanical stirring. Add 3.26 g 0.2 M HCl and stirred for about 10 minutes.

Step 2. 22.74 g DCOIT was added. Stirring was continued for 10 minutes. This is the DCOIT solution.

Step 3. 28 g Dynasylan A (or TEOS) and 10.25 g MTMS were mixed in a separate container, and poured into the DCOIT solution. The reaction mixture was stirred for 5-15 minutes or until homogenous.

Step 4. 0.2 g $NH_4OH$-base catalyst (see above) was added to the reaction mixture. After 30 minutes another 0.25 g was poured into the jar (monitor the pH, it should not exceed 8.5).

Step 5. The reaction mixture was stirred until gelling commenced. The mixing speed was reduced when the sol-gel became thick, and then the wet gel was transferred to a mould or container for aging.

Step 6. The container was closed, and the material was left to mature for approx. 3 days (can be done in the fridge).

Step 7. The aged gel was frozen in an industrial freezer at −80° C. overnight and then freeze-dried at a pressure of <10 mbar and a condensor temperature of −110° C. Yield: 40.4 g.

Gel Example 5. Preparing an Aerogel with App. 75% Encapsulated Econea from Precondensated TEOS (or Pure TEOS)

Step 1. Solution 1: 22.0 g pre-condensated TEOS (or pure TEOS), 10.43 g MTMS, and 90.0 g Ethanol (96.6%) was stirred with a mechanical stirrer in a glass container for approx. 10 minutes. 38.0 g Econea was added with mixing. The solution was mixed for additionally 10 minutes.

Step 2. Solution 2: 1.0 g Ethanol (96.6%), 60.0 g Water (demineralised) and 6.0 g of catalyst base (see Reference Example 1).

Step 3. Solution 2 was added to solution 1 during mixing at full speed on the mechanical stirrer. The gelation took place after additionally 50 minutes of mixing. The wet gel was moved to a container with a lid. The obtained gel was aged for approx. 3-5 days, before drying.

Step 4. The aged gel was frozen in an industrial freezer at −80° C. overnight and then freeze-dried at a pressure of <10 mbar and a condensor temperature of −110° C. Yield: approx. 50 g.

For porosimetry comparison purposes a similar wet gel with the same end concentration of Econea was prepared and dried under supercritical conditions. The wet gel from step 3) was cut into smaller pieces and transferred to a ½ L pressure vessel (½ L flow reactor, equipped with heating jacket and metal frits in both ends). The temperature in the heating jacket was raised to 37-40° C. and the pressure raised to 100 bars, at a rate of 3 bars/min. For approx. 4 hours at 40° C. and 100 bars, 2½ kg of $CO_2$ was flowed through the vessel at a rate of approximately 6 mL/min. After flowing the pressure was slowly released during 2 hour. The weight of the supercritical dried aerogel was approx. 50 g.

Gel Example 6. Preparing an Aerogel with App. 75% Encapsulated ZnPT from Precondensated TEOS (or Pure TEOS)

Step 1. Solution 1: 28.16 g pre-condensated TEOS (or pure TEOS), 13.35 g of MTMS and 115.2 g Ethanol (96.6%) were stirred with a mechanical stirrer in a glass container for approx. 15 minutes. 48.64 g Zinc pyrithione was added with mixing. The solution was mixed for additionally 15 minutes.

Step 2. Solution 2: 1.28 g Ethanol (96.6%), 76.8 g Water (demineralised) and 3.71 g of catalyst base (see Reference Example 1).

Step 3. Solution 2 was added to solution 1 during mixing at full speed on the mechanical stirrer. After about 48 minutes of mixing the gelation took place. The obtained gel was aged for approx. 3-5 days before drying.

Step 4. The aged gel was frozen in an industrial freezer at −80° C. overnight and then freeze-dried at a pressure of <10 mbar and a condensor temperature of −110° C. Yield: app. 65 gr

Gel Example 7. Preparing an Aerogel with App. 66.4% Encapsulated Medetomidine from Pre-Condensated TEOS Step 1. Solution 1: 4.4 g pre-condensated TEOS (or pure TEOS), 2.09 g of MTMS and 18.0 g Ethanol (96.6%) were stirred with a mechanical stirrer in a glass container for approx. 15 minutes. 5.0 g Medetomidine was added with mixing. The solution was mixed for additional 15 minutes.

Step 2. Solution 2: 0.2 g Ethanol (96.6%), 12.0 g Water (demineralised) and 1.2 g of catalyst base (see Reference Example 1).

Step 3. Solution 2 was added to solution 1 during mixing at full speed on the mechanical stirrer. After about 57 minutes of mixing the gelation took place. The obtained gel was aged for approx. 3-5 days before drying.

Step 4. The aged gel was frozen in an industrial freezer at −80° C. overnight and then freeze-dried at a pressure of <10 mbar and a condensor temperature of −110° C. Yield: app. 7.5 g.

Gel Example 8. Preparing an Aerogel with App. 75% Encapsulated 2-(4-Thiazolyl) Benzimidazole from Pre-Condensated TEOS Step 1. Solution 1: 11.0 g pre-condensated TEOS (or pure TEOS), 5.22 g of MTMS and 45.0 g Ethanol (96.6%) were stirred with a mechanical stirrer in a glass container for approx. 15 minutes. 19.0 g Thiabendazole was added with mixing. The solution was mixed for additional 15 minutes.

Step 2. Solution 2: 0.5 g Ethanol (96.6%), 30.0 g Water (demineralised) and 3.0 g of catalyst base (see Reference Example 1).

Step 3. Solution 2 was added to solution 1 during mixing at full speed on the mechanical stirrer. After about 22 minutes of mixing the gelation took place. The obtained gel was aged for approx. 3-5 days before drying.

Step 4. The aged gel was frozen in an industrial freezer at −80° C. overnight and then freeze-dried at a pressure of <10 mbar and a condensor temperature of −110° C. Yield: app. 25 g.

Gel Example 9. Preparing an Aerogel with App. 75% Encapsulated Tebuconazole from Precondensated TEOS Step 1. Solution 1: 11.0 g pre-condensated TEOS (or pure TEOS), 5.22 g of MTMS and 45.0 g Ethanol (96.6%) were stirred with a mechanical stirrer in a glass container for approx. 15 minutes. 19.0 g Tebuconazole was added with mixing. The solution was mixed for additional 15 minutes.

Step 2. Solution 2: 0.5 g Ethanol (96.6%), 30.0 g Water (demineralised) and 3.0 g of catalyst base (see Reference Example 1).

Step 3. Solution 2 was added to solution 1 during mixing at full speed on the mechanical stirrer. After about 22 minutes of mixing the gelation took place. The obtained gel was aged for approx. 3-5 days before drying.

Step 4. The aged gel was frozen in an industrial freezer at −80° C. overnight and then freeze-dried at a pressure of <10 mbar and a condensor temperature of −110° C. Yield: app. 25 g.

Methods Characterization Aerogels

Mercury Intrusion Analysis

High-pressure mercury (Hg) intrusion analysis was performed in an Autopore V equipment (early measurements: Autopore IV model 9520 or similar) from Micromeritics. The samples were measured in a pressure range from 0.5 psia to 30000 psia, equivalent to a pore size scan between 338 μm to 6.6 nm.

1. All samples were loaded into a penetrometer specifically designed to analyze powder samples (i.e. volume 5 ml, capillary stem volume of 1.13 ml). The amount of sample poured into the penetrometer, was enough to attain a volume stem usage of 20%, which ensures a better resolution of the data.

2. Prior to analysis, the penetrometer with sample was submitted to a degassing treatment, under vacuum, to a set-point limit below 50 μm Hg. The samples were then analyzed in two different operation modes: low-pressure (up to 40 psia, 17 number of points) and high-pressure (up to 30000 psia, 32 number of points).

3. Once low-pressure analysis is done the penetrometer containing Hg and packed-bed, is weighed again, being the value used as software input to determine the bulk density (i.e. interparticle porosity).

4. Then, the penetrometer is placed into a high-pressure port and while going to higher pressures the intraparticle porosity was determined, being related with apparent density.

5. The pore diameter was calculated using Washburn equation, assuming a contact angle (θ) of 130 degrees and a value of mercury surface tension (γ) of 0.48 J/m². Finally, the summary of the data is displayed by the equipment software.

Water Absorption

A small sample approx. 0.2 grams is weighed in a small petri dish and placed in a desiccator with blue silica gel in the bottom and placed in a climate room.

1. The weight loss of the sample is recorded until a stable weight is obtained, normally after 4 to 6 days, and the dry weight is recorded.

2. The dry sample is placed in a desiccator with tap water in the bottom (approx. 86% RH). The gained weight of the sample is recorded until stable weight is obtained normally after 4 to 6 days.

The weight gained is calculated. This can be expressed as Pore volume=(weight of saturated sample−weight of dried sample)/density of water.

The test is performed in duplo at 23±2° C.

BET Analysis

By BET (Brunauer, Emmett and Teller) analysis, the specific surface area of a sample is measured, including the pore size distribution. The specific surface area of a powder is determined by physical adsorption of a gas on the surface of the solid and by calculating the amount of adsorbate gas corresponding to a monomolecular layer on the surface. Physical adsorption results from relatively weak forces (van der Waals forces) between the adsorbate gas molecules and the adsorbent surface area of the test powder. The determination is usually carried out at the temperature of liquid nitrogen. The amount of gas adsorbed can be measured by a volumetric or continuous flow procedure. Note that this method assumes that gas communicates between the pores and the surrounding volume. In practice, this means that the pores must not be closed cavities. BET equipment used for this study: Micromeritics Gemini series with Micromeritics VacPrep or equivalent drying station. Pore volumes $>4 \cdot 10^{-6}$ cm³/g can be measured.

Thermogravimetric (TGA) Measurements

The samples have been analysed in a Mettler Toledo TGA 40. The samples, typically 10-25 mg, are placed in a crucible and weighed. The temperature is raised from room temperature to 800° C. at 10° C./minute. The weight loss is registered. Solvents disappear typically before 250° C., and in connection with gel production typically before 150° C. Other organic material incl. polymers disappear before 450° C. At 800° C. normally only the inorganic material is left. A function control of the equipment is made with Indium to make sure that the temperature profile is within the calibration of the equipment. The weight loss is evaluated using the software program STARe version 7.01.

Measurement of the Collapse Temperature $T_C$ for Frozen Wet Gels by FDM

Freeze drying microscopy (FDM) may be used to assess the collapse temperature $T_C$ for frozen wet gels of the invention before contemplating freeze-drying. This allows determination of the optimal freeze-drying conditions by establishing the minimum temperature which is required to avoid collapse of the sample. For FDM, the sample is frozen inside a small microscope chamber by using liquid nitrogen. While applying a vacuum, the temperature is gradually increased and the sample dries. During this temperature ramp, the sublimation front is observed and recorded through a microscope. Changes in the dried layer can be used to determine the state of the system (amorphous or crystalline) and the collapse temperature of the sample.

Thermal Conductivity Measurements

Test Methods

According to ISO 22007-1 (2008): General principles—line source method According to ASTM D 5930-0: Test Method for Thermal Conductivity of Plastics by Means of a Transient Line-Source Technique. Measurements are based on a variation of the hot-wire method (needle-probe method) which is a transient technique that measures temperature changes at a known distance from a linear heat source embedded in the test sample Equipment ISOMET 2114 Heat transfer analyzer—equipped with needle probe (0.015-0.050 [W/m K]). The ISOMET 2114 is a portable hand-held measuring instrument for direct measurement of heat transfer properties of a wide range of isotropic materials including cellular insulating materials, plastics, liquids, powder-like materials, and soils.

Test Conditions

Mean measurement temperature at approx. 25° C.

Measurements were carried out in series of 6 measurements with a 10-minute pause between each measurement. Test results are shown in FIG. 7.

Anti-Fouling Paint Composition

The water absorption of the paint film is a critical parameter connected to leaching layer, leaching of the active compound, erosion rate and thus anti-fouling properties. Water absorption is influenced by the choice of pigmentation, the chosen gel and the amount of gel. The aerogels are very porous and an equilibrium between the different components has to be achieved before valid measurements can be performed. It has been shown that in a paint composition the binder system penetrates the aerogel, which reduces the water absorption until the equilibrium between the components is attained, and also assures that the aerogel particles are securely fastened in the dried paint layer and not washed out over time by exposure to water. In sealant compositions a similar mechanism is conceivably operable. It is assumed that gels with high intrusion volume values (as measured by mercury poromesitry) can be penetrated easier by the binder system.

REFERENCES

1. S Cztonka et al. Freeze-drying method as a new approach to the synthesis of polyurea aerogels from isocyanate and water. Journal of Sol-Gel Science and Technology (2018) 87:685-695
2. A Muhammad et al. Recent Progress in Polysaccharide Aerogels: Their Synthesis, Application, and Future Outlook. Polymers 2021, 13, 1347
3. K Onwukamike et al. Sustainable Approach for Aerogel Preparation from the DBU-CO2 Switchable Solvent. ACS Sustainable Chemistry & Engineering, American Chemical Society, 2019, 7 (3), pp. 3329-3338.
4. Bertino et al. "METHODS FOR FABRICATION OF SILICA AEROGELS WITH CUSTOM SHAPES USING FREEZE DRYING. US 2019/0143290 A1 (May 2019)
5. L S White et al. Fabrication of native silica, cross-linked, and hybrid aerogel monoliths. Transl. Mater. Res. 3 015002 (2016)
6. S. Holberg et al. FOULING-RELEASE COATINGS FOR STEAM CONDENSERS. Heat Exchanger Fouling and Cleaning-2017, p. 177
7. K-J Kim et al. THERMAL INSULATING COATING WITH LOW THERMAL CONDUCTIVITY. WO 2018/200488 A1 (2018)
8. Zhang et al. Synthesis, Structural and Thermal Properties of Nanoporous SiO2-based Aerogels, Advances in Nanocomposites—Synthesis, Characterization and Industrial Applications (2011). Dr. Boreddy Reddy (Ed.), ISBN: 978-953-307-165-7 (Chapter 3, page 39-60)
9. Li et al., Silica aerogels with tailored chemical functionality. Materials and Design 193 (2020) 108833
10. K Sinco, Influence of Chemical Conditions on the Nanoporous Structure of Silicate Aerogels. Materials 2010, 3, 704-740
11. G Swain et al., Comparing Biofouling Control Treatments for Use on Aquaculture Nets. Int J Mol Sci. 2014 December; 15(12): 22142-22154.
12. Dorcheh et al. Silica aerogel; synthesis, properties and characterization. Journal of Materials Processing Technology Volume 199, Issues 1-3, 1 Apr. 2008, Pages 10-26

The invention claimed is:

1. Antifouling additive comprising:
   a. a freeze-dried inorganic, silica-containing aerogel comprising a porous gel lattice with
      i. a total porosity of at least 40%, and
      ii. a mesopore diameter of at least 10 nm,
   b. optionally an alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
   c. at least 55% by weight of one or more biocidal or biorepellant compounds selected from 4,5-dichloro-2-octyl-4-isothiazolin-3-one (DCOIT), 2-(p-chlorophenyl)-3-cyano-4-bromo-5-trifluoromethyl pyrrole, zinc ethylenebis (dithiocarbamate) (Zineb), 3-(3,4-dichlorophenyl)-1,1-dimethylurea 3-iodo-2-propynylbutylcarbamate (IPBC), 2-tert-butylamino-4-ethylamino-6-methyl-thio-1,3,5-triazine (terbutryn), 1-(4-chlorophenyl)-4,4-dimethyl-3-(1H-1,2,4-triazol-1-ylmethyl) pentan-3-ol (tebuconazole), zinc pyrithione, tolylfluanid, dichlofluanid, N,N-didecyl-N,N-dimethylammonium carbonate N,N-didecyl-N,N-dimethylammonium bicarbonate, 2-thiazol-4-yl-1H-benzoimidazole (thiabendazole), 4-[1-(2,3-dimethylphenyl) ethyl]-3H-imidazole (medetomidine), and mixtures thereof entrapped in said aerogel,
      wherein the entrapment of said one or more biocidal or biorepellant compounds takes place during the sol-gel formation of the gel and wherein the sol-gel precursor is one or more alkoxysilanes selected from tetraethoxysilane, tetra-n-propoxysilane and alkyltrialkoxysilanes, and wherein the inorganic, silica-containing aerogel contains alkoxysilane (Si—OR) terminal groups selected from ethoxysilane (Si—OEt) or n-propoxysilane (Si—OPr) groups.

2. Antifouling additive according to claim 1, wherein the sol-gel alkoxy-silane precursor is tetraethoxysilane and wherein the inorganic, silica-containing aerogel contains ethoxysilane (Si—OEt) terminal groups.

3. Antifouling additive according claim 1 comprising at least 60% by weight of the one or more biocidal or biorepellant compounds.

4. Antifouling additive according to claim 1 having a mesopore diameter of at least 11 nm.

5. Antifouling additive according to claim 1 having a total porosity of at least 50%.

6. Antifouling additive according to claim 1 having a thermal conductivity (lambda value) of <100 mW/m*K.

7. Antifouling additive according to claim 6 having a thermal conductivity (lambda value) of between 30-75 mW/m*K.

8. Antifouling additive according to claim 1 wherein the alkyltrialkoxysilane is selected from MTMS (methyltrimethoxysilane) and MTES (methyltriethoxysilane).

9. Antifouling additive according to claim 1, wherein the one or more biocidal or biorepellant compounds is selected from zinc pyrithione, 2-(p-chlorophenyl)-3-cyano-4-bromo-5-trifluoromethyl pyrrole, 4,5-dichloro-2-octyl-4-isothiazolin-3-one (DCOIT), and zinc ethylenebis (dithiocarbamate) (Zineb).

10. Antifouling coating composition comprising an antifouling additive according to claim 1 for use on off-shore surfaces regularly or constantly submerged in water.

11. Antifouling coating composition, comprising an antifouling additive according to claim 1.

12. Antifouling sealant composition comprising an antifouling additive according to claim 1.

* * * * *